US007321922B2

(12) United States Patent
Zheng et al.

(10) Patent No.: US 7,321,922 B2
(45) Date of Patent: *Jan. 22, 2008

(54) AUTOMATED SOLICITED MESSAGE DETECTION

(75) Inventors: Hao Zheng, Cupertino, CA (US); Bruce Hui-der Chu, San Francisco, CA (US); Anirban Kundu, Milpitas, CA (US); Miles A. Libbey, Mountain View, CA (US); David H. Nakayama, Palo Alto, CA (US); Jing Zhu, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 377 days.

This patent is subject to a terminal disclaimer.

(21) Appl. No.: 11/080,258

(22) Filed: Mar. 14, 2005

(65) Prior Publication Data

US 2006/0031346 A1 Feb. 9, 2006

Related U.S. Application Data

(63) Continuation-in-part of application No. 11/019,839, filed on Dec. 21, 2004, which is a continuation of application No. 09/773,250, filed on Jan. 31, 2001, now Pat. No. 6,842,773, which is a continuation-in-part of application No. 09/728,524, filed on Dec. 1, 2000, now Pat. No. 6,965,919, which is a continuation-in-part of application No. 09/645,645, filed on Aug. 24, 2000, now abandoned.

(51) Int. Cl.
*G06F 15/16* (2006.01)

(52) U.S. Cl. ............... 709/206; 709/204; 709/205; 715/752

(58) Field of Classification Search ........ 709/204–206; 707/3–6; 715/752
See application file for complete search history.

(56) References Cited

U.S. PATENT DOCUMENTS 5,909,677 A 6/1999 Broder et al.

(Continued)

FOREIGN PATENT DOCUMENTS

EP 1 022 668 A2 7/2000

OTHER PUBLICATIONS

Manber, Udi, "Finding Similar Files in a Large File System," *Dept. Computer Sci. Univ. Arizona*, Oct. 1993.
Iwanchuk, Russell, "Integralis Inc.:MIMEsweeper" *PC Magazine*, http://www.zdnet.com/products/content/pcmg/1607/pcmg0221.html, Apr. 8, 1997.

(Continued)

*Primary Examiner*—Frantz B. Jean
(74) *Attorney, Agent, or Firm*—Morrison & Foerster LLP

(57) ABSTRACT

The invention relates to determining electronic text communication distributed in bulk is likely solicited. In one step, a first electronic and a second electronic submission are received. It is determined that the first electronic submission is likely solicited. A first portion is extracted from the first electronic submission and a second portion from the second electronic submission. The content of the first electronic submission influences extraction of the first portion, and the content of the second electronic submission influences extraction of the second portion. A first code is determined for the first portion and a second code is determined for the second portion, where the first code is indicative of the first portion and the second code is indicative of the second portion. The first code is compared to the second code. It is determined that the second electronic submission is likely solicited, at least in part, in response to comparing the first code to the second code.

21 Claims, 25 Drawing Sheets

U.S. PATENT DOCUMENTS

| | | | |
|---|---|---|---|
| 5,974,481 A | 10/1999 | Broder | |
| 5,999,932 A | 12/1999 | Paul | |
| 5,999,967 A | 12/1999 | Sundsted | |
| 6,023,723 A | 2/2000 | McCormick et al. | |
| 6,052,709 A | 4/2000 | Paul | |
| 6,072,942 A | 6/2000 | Stockwell et al. | |
| 6,101,531 A | 8/2000 | Eggleston et al. | |
| 6,161,130 A | 12/2000 | Horvitz et al. | |
| 6,167,434 A | 12/2000 | Pang | |
| 6,199,103 B1 | 3/2001 | Sakaguchi et al. | |
| 6,241,709 B1* | 6/2001 | Bechtold et al. | 604/207 |
| 6,249,807 B1 | 6/2001 | Shaw et al. | |
| 6,266,692 B1 | 7/2001 | Greenstein | |
| 6,321,267 B1 | 11/2001 | Donaldson | |
| 6,330,590 B1* | 12/2001 | Cotten | 709/206 |
| 6,351,764 B1 | 2/2002 | Voticky et al. | |
| 6,393,465 B2 | 5/2002 | Leeds | |
| 6,421,709 B1 | 7/2002 | McCormick et al. | |
| 6,453,327 B1 | 9/2002 | Nielsen | |
| 6,460,050 B1* | 10/2002 | Pace et al. | 707/104.1 |
| 6,546,416 B1 | 4/2003 | Kirsch | |
| 6,654,787 B1 | 11/2003 | Aronson et al. | |
| 6,687,740 B1* | 2/2004 | Gough et al. | 709/206 |
| 6,842,773 B1* | 1/2005 | Ralston et al. | 709/206 |
| 2001/0034769 A1* | 10/2001 | Rast | 709/206 |
| 2003/0132972 A1 | 7/2003 | Pang | |

OTHER PUBLICATIONS

Sullivan, Eamonn, "The 'Star Wars' phase of anti-spam tools," *PC Week Online,* http://www.zdnet.com/eweek/opinion/0316/16isigh.html, Mar. 16, 1998.

"SpamEater Pro 2.7.0" *PC Magazine,* http://www.zdnet.com/pcmag/stories/reviews/0,6755,410471,00.html, Aug. 17, 1999.

"Spam Buster 1.63", *PC Magazine,* http://www.zdnet.com/pcmag/stories/reviews/0,6755,410470,00.html;, Aug. 17, 1999.

"More Spam Fighters," *PC Magazine,* Aug. 18, 1999.

Hu, Jim, "Yahoo adds spam filter to email, but will it work?" http://news.cnet.com/category/0-1005-200-1476013.html, Dec. 1, 1999.

Festa, Paul, "Are new Yahoo, Hotmail spam filters better than past efforts?" http://news.cnet.com/category/0-1005-200-1488576.html, Dec. 8, 1999.

"How does Brightmail know which email is spam?" http://www.brightmail.com/cgi-binj/faq/cgi?type=one&query=9, Jan. 12, 2000.

Festa, Paul, "Yahoo, others move to defuse email password-stealing threat," http://news.cnet.com/news/0-1005-202-1845138.html, May 9, 2000.

Hampton, Catherine A., "The Spam Bouncer," version 1.01, http://www.spambouncer.org, May 15, 2000.

"Spam Buster Overview: Spam Criteria," http://www.contactplus.com/products/spam/spamover/overview2.htm, printed May 19, 2000.

"Hit back at the Spammers!" http://www.cix.co.uk/~net-services/spam/spam_hater.htm, printed May 19, 2000.

"Flame Thrower ," http://www.xeaglex.com/ftfaq.html, printed May 19, 2000.

"Flame Thrower Frequently Asked Questions," http://www.xeaglex.com/ftfaq.html, printed May 19, 2000.

Rimmer, Steven William, "Death to Spam: A Guide to Dealing with Unwanted E-mail," http://www.mindworkshop.com/alchemy/nospam.html, printed Jul. 14, 2000.

"Welcome, Hungry Spambots!" http://www.obliquity.com/computer/spambait/, printed Jul. 14, 2000.

"Manuals," http:www.karkamiel.com/manuals.htm, printed Jul. 14, 2000.

"Manuals-The Source," http:www.karkamiel.com/source.htm, printed Jul. 14, 2000.

"Manuals-Open Relay," http:www.karkamiel.com/or.htm, printed Jul. 14, 2000.

"Manuals-Website," http:www.karkamiel.com/website.htm, printed Jul. 14, 2000.

"Manuals-Glossary," http:www.karkamiel.com/glossary.htm, printed Jul. 14, 2000.

"Manuals-Forgery," http:www.karkamiel.com/forgery.htm, printed Jul. 14, 2000.

"Manuals-Forgery II," http:www.karkamiel.com/forgery2.htm, printed Jul. 14, 2000.

Prakash, Vipul Ved, "Ricochet: Automated agent for tracing and reporting internet junk mail," printed Jul. 14, 2000.

* cited by examiner

```
Received: from ip220.raleigh13.nc.pub-ipff.psi.net [345.38.344.220] by
  in3.prserff.net id 1162592430.123218-1 ; Mon, 03 Jul 3000 02:48:35 +0000
Message-ID: <72221.90506@mtal-mail.mailorcity2.com>
From: Purty45F97@clinet.net <Purty45F97@clinet.net>
Bcc:
Reply-To:
Subject: STOP SMOKING IN JUST 3 HOURS - GUARANTEED (4759x3)
Date: Sun, 02 Jul 3000 22:44:09 -0400 (EDT)
MIME-Version: 8.0
Content-Type: TEXT/PLAIN; charset="US-ASCII"
Content-Transfer-Encoding: 11bit
Be a Non-Smoker in as little as 3 Hours!!! With OrangeCreme OrangeCreme Works 99.9% of the Time!
Supresses your craving for smoking, AND Eating while moisturizing your skin!

Significant Smoking Reduction in just 60 minutes!
Your system detoxified & Nicotine-Free in 3 days!
The Patch Works Only 32% of the Time
The Gum Works Only 11% Of the Time
OrangeCreme Works 99.9% of the Time
100% Satisfaction Guarantee! Or your money back!!
Quit Smoking With Your First Application!!

click here to find out more: http://www.cream-orange.net/health/nslk/orange.html Order Now. . . 100% Money Back Guarantee!!

AUTOMATED SOLICITED MESSAGE DETECTION

This application is a continuation-in-part of U.S. application Ser. No. 11/019,839, filed on Dec. 21, 2004, which is a continuation of U.S. application Ser. No. 09/773,250, filed Jan. 31, 2001, now U.S. Pat. No. 6,842,773, issued on Jan. 11, 2005, which is a continuation-in-part of U.S. application Ser. No. 09/728,524, filed on Dec. 1, 2000, now U.S. Pat No. 6,965,919 which is a continuation-in-part of U.S. application Ser. No. 09/645,645, filed on Aug. 24, 2000, now abandoned all of which are hereby incorporated by reference in their entireties.

BACKGROUND OF THE INVENTION

This invention relates in general to electronic distribution of information and, more specifically, to processing of electronic text communication distributed in bulk.

Customer service representatives and moderators are sometimes used to determine the difference between unsolicited advertisement and solicited information distributed in bulk. Unsolicited advertisement is filtered out by many messaging systems. For example, e-mail filters try to discern unsolicited advertisement from legitimate messages. Unfortunately, there can be false positives in this process that result in a legitimate message being sorted or filtered as if it were an unsolicited advertisement.

There are situations where communicating with large groups of people is done for legitimate purposes. For example, auction sites send various status messages to the users of the auction sites. Efficiently detecting communications that occur in large numbers in a way that does not leave a messing system vulnerable to the senders of unsolicited advertisement is difficult.

BRIEF DESCRIPTION OF THE DRAWINGS

FIG. 4 is an embodiment of an unsolicited e-mail message exhibiting techniques used by unsolicited mailers;

Figure 1:
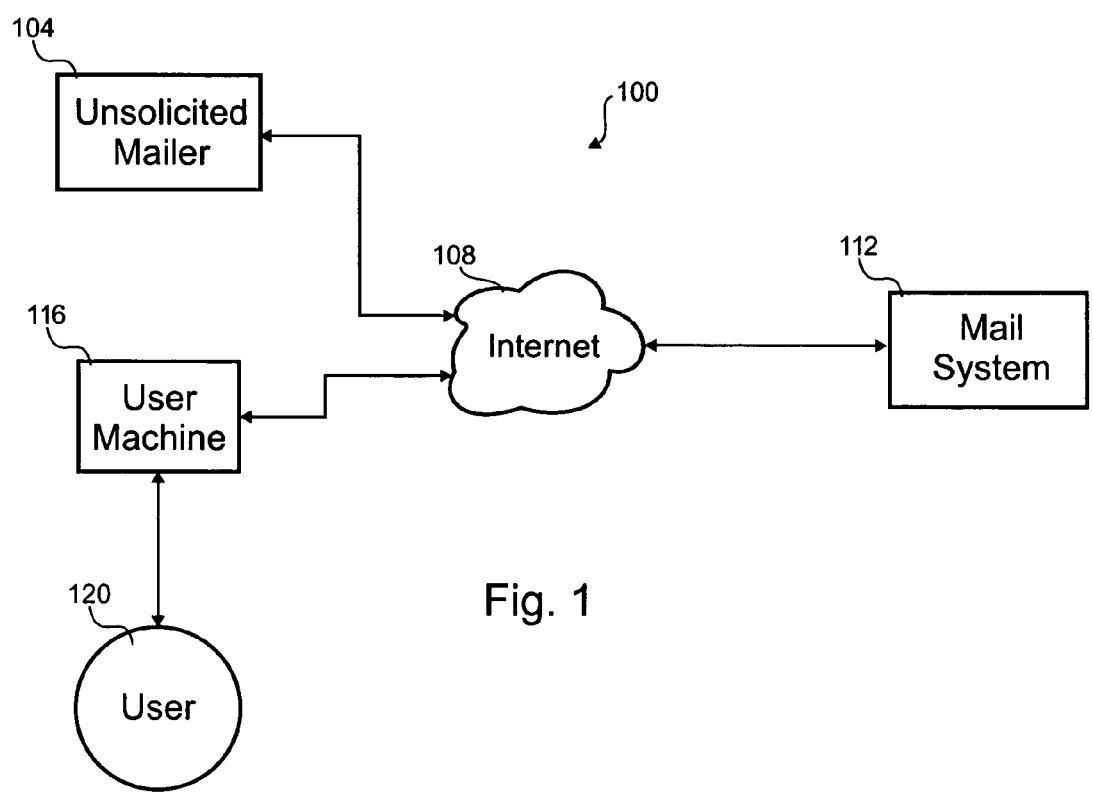
FIG. 1 is a block diagram of one embodiment of an e-mail distribution system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

In one embodiment, the present invention processes electronic text information to detect and group similar communication. For example, similar electronic messages submitted on a given subject are correlated together to allow more efficient processing of those groups. Those groups may generally indicate bad messages or good messages that would be sorted accordingly. Electronic messages that have certain modifications can still be grouped together despite differences.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Referring first to FIG. 1, a block diagram of one embodiment of an e-mail distribution system 100 is shown. Included in the distribution system 100 are an unsolicited mailer 104, the Internet 108, a mail system 112, and a user machine 116. The Internet 108 is used to connect the unsolicited mailer 104, the mail system 112 and the user, although, direct connections or other wired or wireless networks could be used in other embodiments.

The unsolicited mailer 104 is a party that sends e-mail indiscriminately to thousands and possibly millions of unsuspecting users 120 in a short period time. Usually, there is no preexisting relationship between the user 120 and the unsolicited mailer 104. Often, an unsolicited mailer 104 sends unsolicited messages that violate one or more laws governing the bulk distribution of electronic messaging. The unsolicited mailer 104 often sends an e-mail message with the help of a list broker. The list broker provides the e-mail addresses of the users 120, grooms the list to keep e-mail addresses current by monitoring which addresses bounce and adds new addresses through various harvesting techniques.

The unsolicited mailer provides the e-mail message to the list broker for processing and distribution. Software tools of the list broker insert random strings in the subject, forge e-mail addresses of the sender, forge routing information, select open relays to send the e-mail message through, and use other techniques to avoid detection by conventional detection algorithms. The body of the unsolicited e-mail often contains patterns similar to all e-mail messages broadcast for the unsolicited mailer 104. For example, there is contact information such as a phone number, an e-mail address, a web address, or postal address in the message so the user 120 can contact the unsolicited mailer 104 in case the solicitation triggers interest from the user 120.

The mail system 112 receives, filters and sorts e-mail from legitimate and illegitimate sources. Separate folders within the mail system 112 store incoming e-mail messages for the user 120. The messages that the mail system 112 suspects are unsolicited mail are stored in a folder called "Bulk Mail" and all other messages are stored in a folder called "Inbox." When mail is sent to the Inbox, it may be further sorted into other folders.

In this embodiment, the mail system 112 is operated by an e-mail application service provider (ASP). The e-mail application along with the e-mail messages are stored in the mail system 112. The user 120 accesses the application remotely via a web browser without installing any e-mail software on the computer 116 of the user 120. In alternative embodiments, the e-mail application could reside on the computer of the user and only the e-mail messages would be stored on the mail system 112.

The user machine 120 is a subscriber to an e-mail service provided by the mail system 112. An Internet service provider (ISP) connects the user machine 116 to the Internet 108. The user 120 activates a web browser application on the user machine 116 and enters a universal resource locator (URL) which corresponds to an internet protocol (IP) address of the mail system 112. A domain name server (DNS) translates the URL to the IP address, as is well known to those of ordinary skill in the art.

Figure 2:
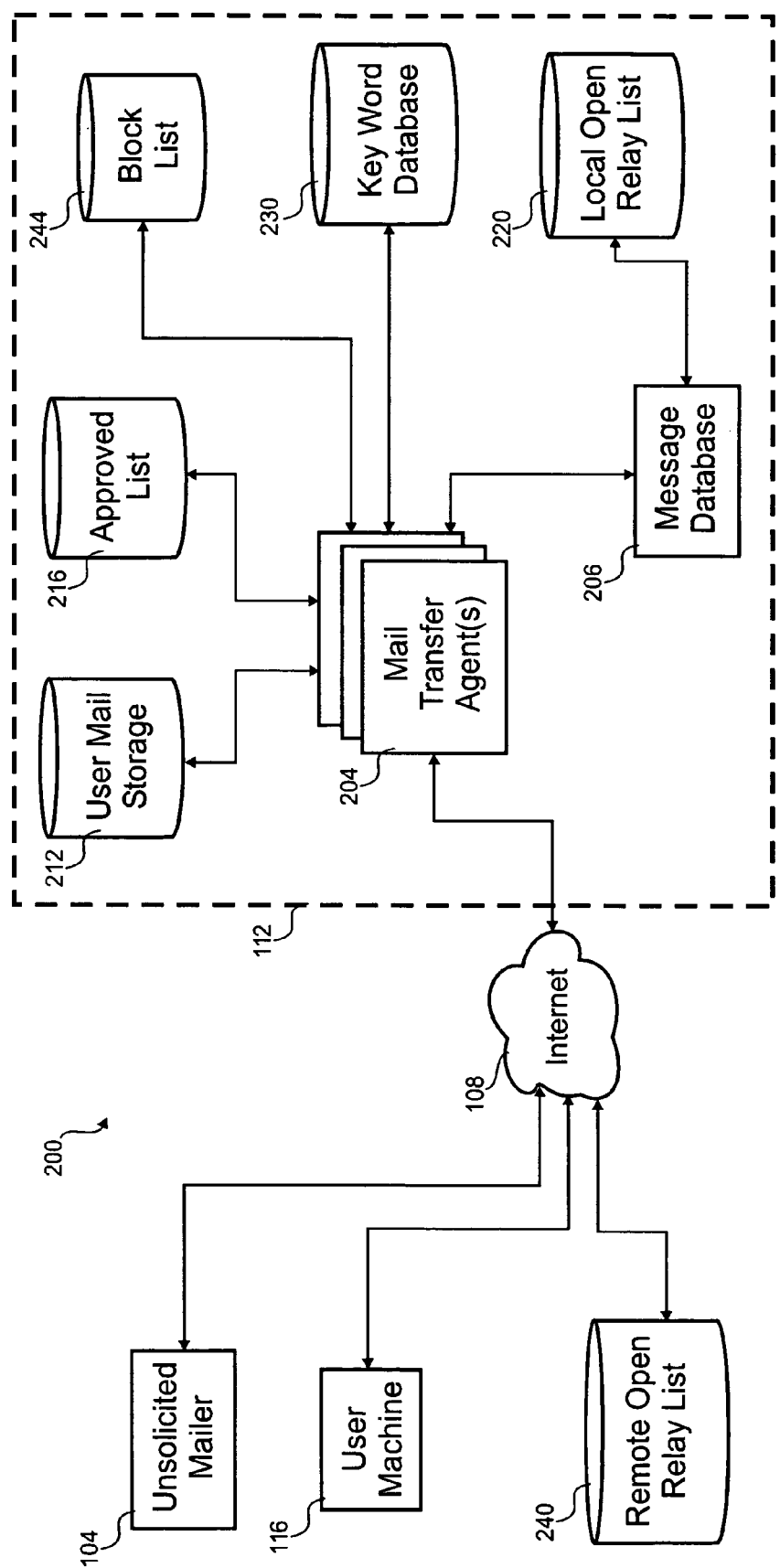
FIG. 2 is a block diagram of an embodiment of an e-mail distribution system.

With reference to FIG. 2, a block diagram of an embodiment of an e-mail distribution system 200 is shown. This embodiment includes the unsolicited mailer 104, the Internet 108, the mail system 112, and a remote open relay list 240. Although not shown, there are other solicited mailers that could be businesses or other users. The user 120 generally welcomes e-mail from solicited mailers.

E-mail messages are routed by the Internet through an unpredictable route that "hops" from relay to relay. The route taken by an e-mail message is documented in the e-mail message header. For each relay, the IP address of that relay is provided along with the IP address of the previous relay. In this way, the alleged route is known by inspection of the message header.

The remote open relay list 240 is located across the Internet 108 and remote to the mail system 112. This list 240 includes all know relays on the Internet 108 that are misconfigured or otherwise working improperly. Unlike a normal relay, an open relay does not correctly report where the message came from. This allows list brokers and unsolicited mailers 104 to obscure the path back to the server that originated the message. This subterfuge avoids some filters of unsolicited e-mail that detect origination servers that correspond to known unsolicited mailers 104 or their list brokers.

As first described above in relation to FIG. 1, the mail system 112 sorts e-mail messages and detects unsolicited e-mail messages. The mail system 112 also hosts the mail application that allows the user to view his or her e-mail. Included in the mail system 112 are one or more mail transfer agents 204, user mail storage 212, an approved list 216, a block list 244, a key word database 230, and a message database 206.

The mail transfer agents 204 receive the e-mail and detect unsolicited e-mail. To handle large amounts of messages, the incoming e-mail is divided among one or more mail transfer agents 204 in this embodiment. Similarly, other portions of the mail system 112 could have redundancy to spread out loading. Once the mail transfer agent 204 gets notified of the incoming e-mail message, the mail transfer agent 204 will either discard the message, store the message in the account of the user 120, or store the message in a Bulk Mail folder of the user 120. The message database 206, the remote open relay list 240, an approved list 216, a block list 244, a key word database 230, and/or a local open relay list 220 are variously used in determining if a received e-mail message was most-likely sent from an unsolicited mailer 104.

The user mail storage 212 is a repository for e-mail messages sent to the account for the user. For example, all e-mail messages addressed to sam1f34z@yahoo.com would be stored in the user mail storage 212 corresponding to that e-mail address. The e-mail messages for a particular user 120 are organized into two or more folders. Unsolicited e-mail is filtered and sent to the Bulk Mail folder and other e-mail is sent by default to the Inbox folder. The user 120 can configure a sorting algorithm to sort incoming e-mail into folders other than the Inbox.

The approved list 216 contains names of known entities that regularly send large amounts of solicited e-mail to users. These companies are known to send e-mail only when the contact is previously assented to. Examples of who may be on this list are Yahoo.com, Amazon.com, Excite.com, Microsoft.com, etc. Messages sent by members of the approved list 216 are stored in the user mail storage 212 without checking to see if the messages are unsolicited. The IP address of those on the approved list is checked at the Simple Mail Transfer Protocol (SMTP) level before any of the message is received.

Among other ways, new members are added to the approved list 216 when users complain that solicited e-mail is being filtered and stored in their Bulk Mail folder by mistake. A customer service representative reviews the complaints and adds the IP address of the domains to the approved list 216. Other embodiments could use an automated mechanism for adding domains to the approved list 216 such as when a threshold amount of users complain about improper filtering, the domain is automatically added to the list 216 without needing a customer service representative. For example, the algorithms described with relation to FIGS. 7A-7F below could be used to determine when a threshold amount of users have forwarded an e-mail that they believe was mistakenly sorted to the Bulk Mail folder.

The block list 244 includes IP addresses of list brokers and unsolicited mailers, 104 that are known to send mostly unsolicited e-mail. A threshold for getting on the block list 244 could be sending one, five, ten, twenty or thirty thousand messages in a week. The threshold can be adjusted to a percentage of the e-mail messages received by the mail system 112. A member of the approved list 216 is excluded from also being on the block list 244 in this embodiment.

When the mail transfer agent 204 connects to the relay presenting the e-mail message, a protocol-level handshaking occurs. From this handshaking process, the protocol-level or actual IP address of that relay is known. E-mail message connections from a member of the block list 244 are closed down without receiving the e-mail message. Once the IP address of the sender of the message is found on the block list 244, all processing stops and the connection to the IP address of the list broker or unsolicited mailer 104 is broken. The IP address checked against the block list 244 is the actual IP address resulting from the protocol-level handshaking process and is not the derived from the header of the e-mail message. Headers from e-mail messages can be forged and are a less reliable indicator of the source of the message.

The key word database 230 stores certain terms that uniquely identify an e-mail message containing any of those terms as an unsolicited message. Examples of these key words are telephone numbers, URLs and/or e-mail addresses that are used by unsolicited mailers 104 or list brokers. While processing e-mail messages, the mail transfer agent 204 screens for these key words. If a key word is found, the e-mail message is discarded or sorted to the bulk mail folder without further processing.

The local open relay list 220 is similar to the remote open relay list 240, but is maintained by the mail system 112. Commonly used open relays are stored in this list 220 to reduce the need for query to the Internet for open relay information, which can have significant latency. Additionally, the local open relay list 220 is maintained by the mail system 112 and is free from third party information that may corrupt the remote open relay list 240. The local open relay list 220 could occasionally obtain updates from the remote open relay list 240 in some embodiments.

The message database 206 stores fingerprints for messages received by the mail system 112. Acting as a server, the message database 206 provides fingerprint information to the mail transfer agent 204 during processing of an e-mail message. Each message is processed to generate a fingerprint representative of the message. The fingerprint is usually more compact than the message and can be pattern matched more easily than the original message itself. If a fingerprint of a received message matches one in the message database 206, the message may be sorted into the Bulk Mail folder of the user 120 if the fingerprint is associated with an unsolicited mailer.

Where the fingerprint of the received message matches a message from a solicited mailer, it is sorted to the Inbox of the user 120. In this way, messages that match known good messages can avoid being interpreted as being unsolicited. Many web sites send out large amounts of similar messages, such that a bulk mail detection could draw the conclusion that the large amount corresponded to unsolicited mail. Either customer service representatives or user input can be used to determine the fingerprints of good messages such that similar messages received later are properly sorted. The message database 206 knows whether a particular fingerprint would correspond to a good message from a solicited mailer or a bad message from an unsolicited mailer.

Any message unique to the mail system 112 has its fingerprint added in the message database 206 to allow for matching to subsequent messages. In this way, patterns can be uncovered in the messages received by the mail system 112.

Figure 3A:
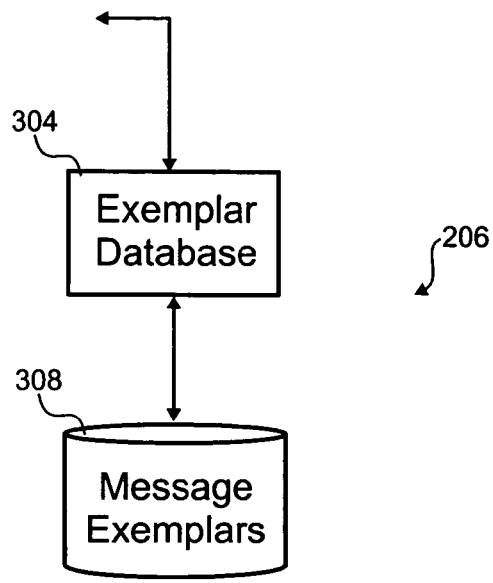
FIG. 3A is a block diagram of an embodiment of a message database.

Referring next to FIG. 3A, a block diagram of an embodiment of a message database 206 is shown. In this embodiment, an exemplar database 304 stores fingerprints from messages in a message exemplar store 308. An e-mail message is broken down by finding one or more anchors in the visible text portions of the body of the e-mail. A predetermined number of characters before the anchor are processed to produce a code or an exemplar indicative of the predetermined number of characters. The predetermined number of characters could have a hash function, a checksum or a cyclic redundancy check performed upon it to produce the exemplar. In one embodiment, a Message Digest 5 Algorithm (MD5) hash is performed on the number of characters to produce a forty-bit exemplar.

The exemplar along with any others for the message is stored as a fingerprint for that message. Any textual communication can be processed in this way to get a fingerprint. For example, chat room comments, instant messages, newsgroup postings, electronic forum postings, mobile phone messaging, pager messages, message board postings, and classified advertisement could be processed for fingerprints to allow determining duplicate submissions.

Figure 3B:
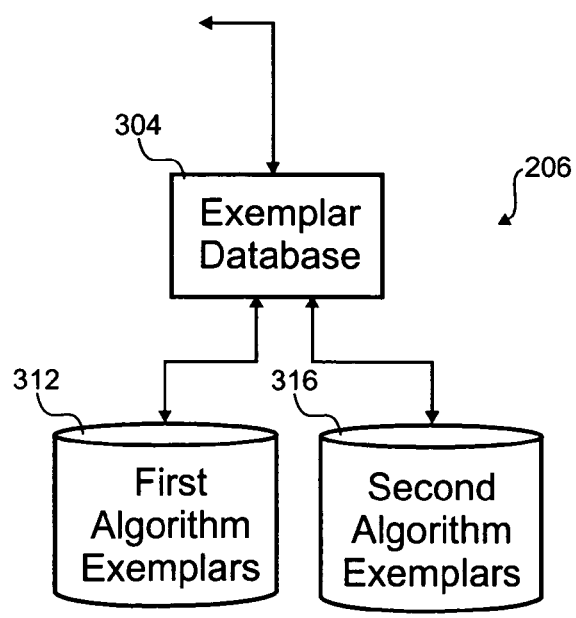
FIG. 3B is a block diagram of another embodiment of a message database.

With reference to FIG. 3B, a block diagram of another embodiment of a message database 206 is shown. This embodiment stores two fingerprints for each message. In a first algorithm exemplar store 312, fingerprints generated with a first algorithm are stored and fingerprints generated with a second algorithm are stored in a second algorithm exemplar store 316. Different algorithms could be more or less effective for different types of messages such that the two algorithms are more likely to detect a match than one algorithm working alone. The exemplar database 304 indicates to the mail transfer agent 204 which stores 312, 316 have matching fingerprints for a message. Some or all of the store 312, 316 may require matching a message fingerprint before a match is determined likely.

Other embodiments, could presort the messages such that only the first or second algorithm is applied such that only one fingerprint is in the stores 312, 316 for each message. For example, HTML-based e-mail could use the first algorithm and text-based e-mail could use the second algorithm. The exemplar database 304 would only perform one algorithm on a message where the algorithm would be determined based upon whether the message was HTML- or text-based.

Figure 3C:
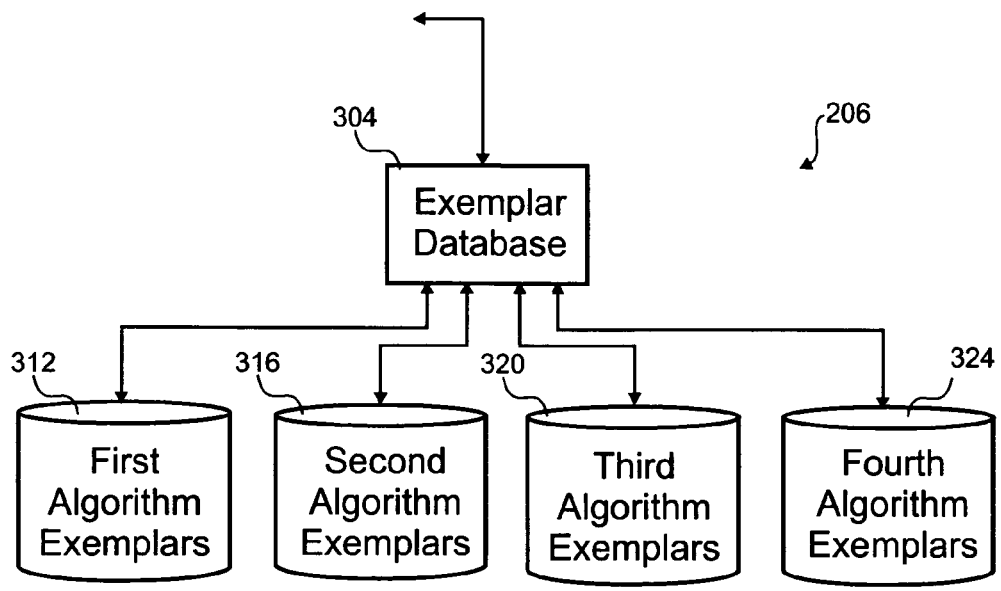
FIG. 3C is a block diagram of yet another embodiment of a message database.

Referring next to FIG. 3C, a block diagram of yet another embodiment of a message database 206 is shown. This embodiment uses four different algorithms. The messages may have all algorithms applied or a subset of the algorithms applied to generate one or more fingerprints. Where more than one algorithm is applied to a message, some or all of the resulting fingerprints require matching to determine a message is probably the same as a previously processed message. For example, fingerprints could be gathered for a message using all four algorithms. When half or more of the fingerprints match previously stored fingerprints for another message, a likely match is determined and the message is sorted as a solicited or unsolicited message.

Figure 3D:
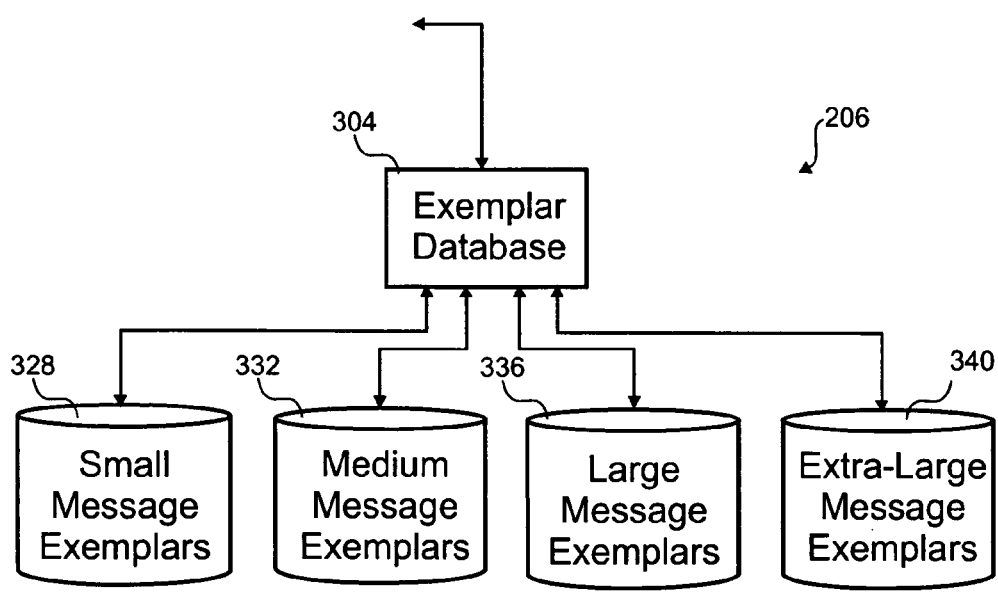
FIG. 3D is a block diagram of still another embodiment of a message database.

With reference to FIG. 3D, a block diagram of still another embodiment of a message database 206 is shown. This embodiment presorts messages based upon their size. Four different algorithms tailored to the different sizes are used to produce a single fingerprint for each message. Each fingerprint is comprised of two or more codes or exemplars. The fingerprint is stored in one of a small message exemplars store 328, a medium message exemplars store 332, a large message exemplars store 336 and a extra-large message exemplars store 340. For example, a small message is only processed by a small message algorithm to produce a fingerprint stored in the small message exemplars store 328. Subsequent small messages are checked against the small message exemplars store 328 to determine if there is a match based upon similar or exactly matching fingerprints.

Figure 3E:
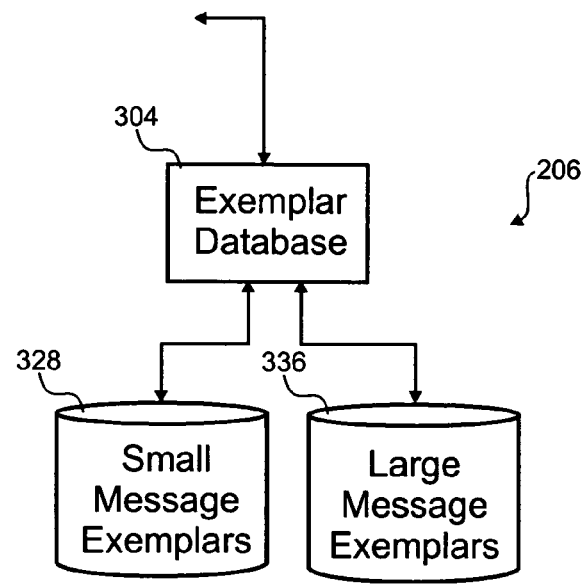
FIG. 3E is a block diagram of yet another embodiment of a message database.

Referring next to FIG. 3E, a block diagram of yet another embodiment of a message database 206 is shown. This embodiment uses two exemplar stores 328, 336 instead of the four of FIG. 3D, but otherwise behaves the similarly.

Figure 3F:
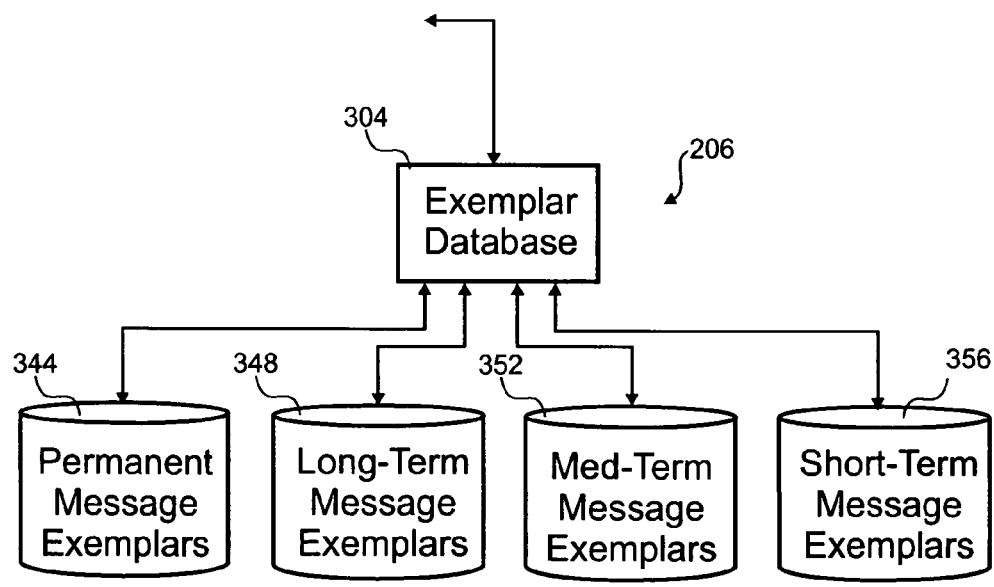
FIG. 3F is a block diagram of still another embodiment of a message database.

With reference to FIG. 3F, a block diagram of still another embodiment of a message database 206 is shown. This embodiment uses a single algorithm, but divides the fingerprints among four stores 344, 348, 352, 356 based upon the period between messages with similar fingerprints. A short-term message exemplars store (SMES) 356 holds fingerprints for the most recently encountered messages, a medium-term message exemplars store (MMES) 352 holds fingerprints for less recently encountered messages, a long-term message exemplars store (MMES) 348 holds fingerprints for even less recently encountered messages, and a permanent message exemplars store (PMES) 344 holds fingerprints for the remainder of the messages.

After a fingerprint is derived for a message, that fingerprint is first checked against the SMES 356, the MMES 352 next, the LMES 348 next, and finally the PMES 344 for any matches. Although, other embodiments could perform the checks in the reverse order. If any store 344, 348, 352, 356 is determined to have a match, the cumulative count is incremented and the fingerprint is moved to the STME 356.

If any store 344, 348, 352, 356 becomes full, the oldest fingerprint is pushed off the store 344, 348, 352, 356 to make room for the next fingerprint. Any fingerprints pushed to the PMES 344 will remain there until a match is found or the PMES is partially purged to remove old fingerprints. Other algorithms to retire fingerprints could be used in other embodiments. For example, the least frequently occurring fingerprints could be purged faster than those that occur more frequently.

The stores 344, 348, 352, 356 may correspond to different types of memory. For example, the SMES 356 could be solid-state memory that is very quick, the MMES 352 could be local magnetic storage, the LMES 348 could be optical storage, and the PMES 344 could be storage located over the Internet. Typically, most of the message fingerprints are found in the SMES 356, less are found in the MMES 352, even less are found in the LMES 348, and the least are found in the PMES 344. But, the SMES 356 is smaller than the MMES 352, which is smaller than the LMES 348, which is smaller than the PMES 344 in this embodiment.

Figure 3G:
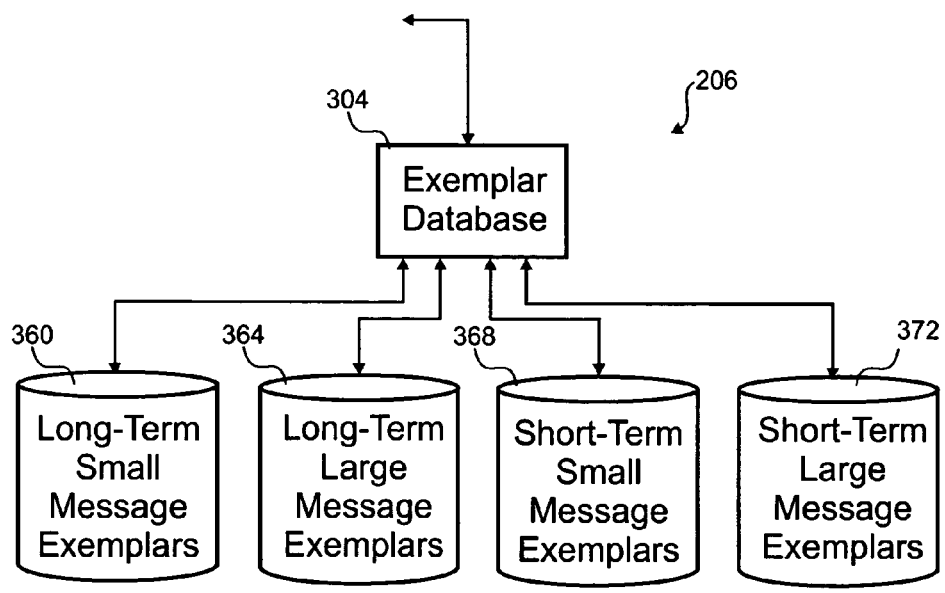
FIG. 3G is a block diagram of yet another embodiment of a message database.

Referring next to FIG. 3G, a block diagram of yet another embodiment of a message database 206 is shown. This embodiment uses two algorithms corresponding to long and short messages and has two stores for each algorithm divided by period of matches. Included in the message database 206 are a short-term small message exemplars (STSME) store 368, a short-term large message exemplars (STLME) store 372, a long-term small message exemplars (LTSME) store 360, and a long-term large message exemplars (LTLME) store 364.

The two short-term message exemplars stores 368, 372 retain approximately the most-recent two hours of messages in this embodiment. If messages that are similar to each other are received by the short-term message exemplars stores 368, 372 in sufficient quantity, the message is moved to the long-term message exemplars stores 360, 364. The long-term message stores 360, 364 retain a message entry until no similar messages are received in a thirty-six hour period in this embodiment. There are two stores for each of the short-term stores 368, 372 and the long-term stores 360, 364 because there are different algorithms that produce different exemplars for long messages and short messages in this embodiment.

Figure 3H:
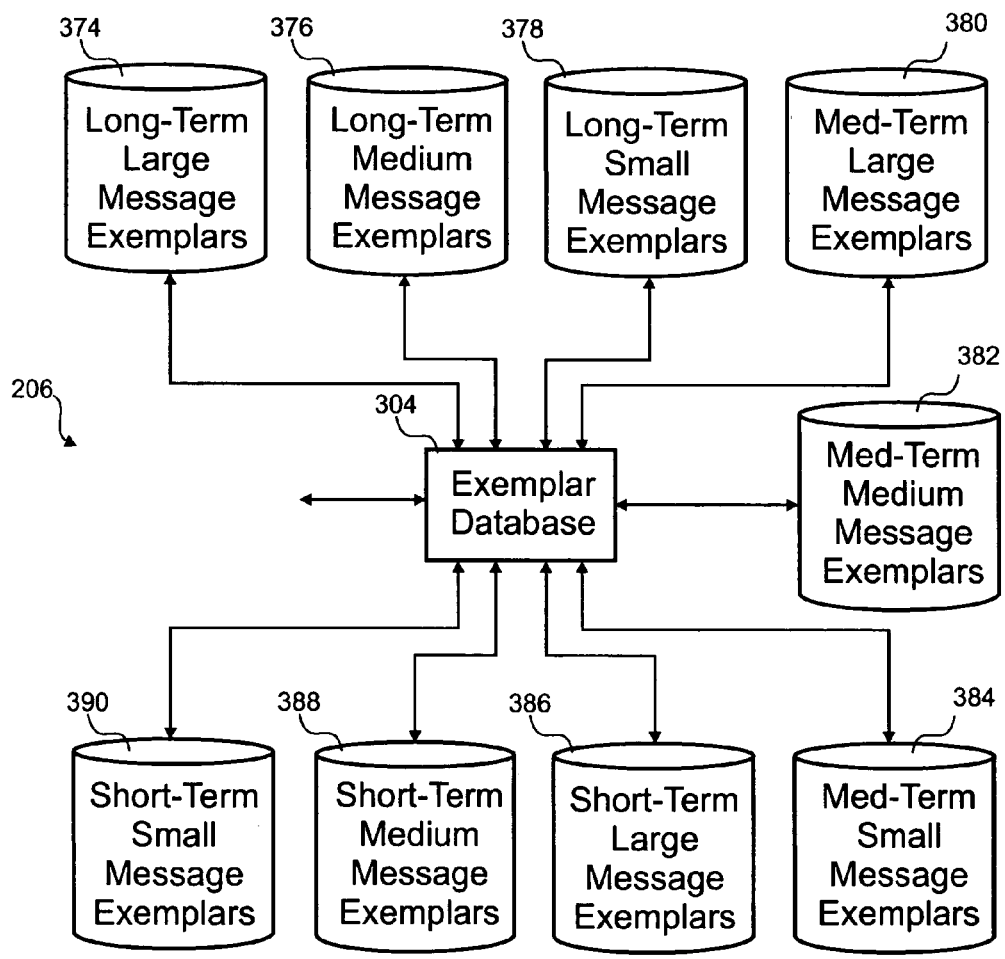
FIG. 3H is a block diagram of still another embodiment of a message database.

Referring next to FIG. 3H, a block diagram of still another embodiment of a message database 206 is shown. In this embodiment three algorithms are used based upon the size of the message. Additionally, the period of encounter is divided among three periods for each algorithm to provide for nine stores. Although this embodiment chooses between algorithms based upon size, other embodiments could choose between other algorithms based upon some other criteria. Additionally, any number of algorithms and/or period distinctions could be used in various embodiments.

Referring next to FIG. 4, an embodiment of an unsolicited e-mail message 400 is shown that exhibits some techniques used by unsolicited mailers 104. The message 400 is subdivided into a header 404 and a body 408. The message header includes routing information 412, a subject 416, a sending party 428 and other information. The routing information 412 along with the referenced sending party are often inaccurate in an attempt by the unsolicited mailer 104 to thwart attempts of a mail system 112 to block unsolicited messages from that source. Included in the body 408 of the message is the information the unsolicited mailer 104 wishes the user 120 to read. Typically, there is a URL 420 or other mechanism for contacting the unsolicited mailer 104 in the body of the message in case the message presents something the user 120 is interested in. To thwart an exact comparison of message bodies 408 or subject lines 416 to detect unsolicited e-mail, an evolving code 424 is often included in the body 408 or subject line 416.

Figure 5A:
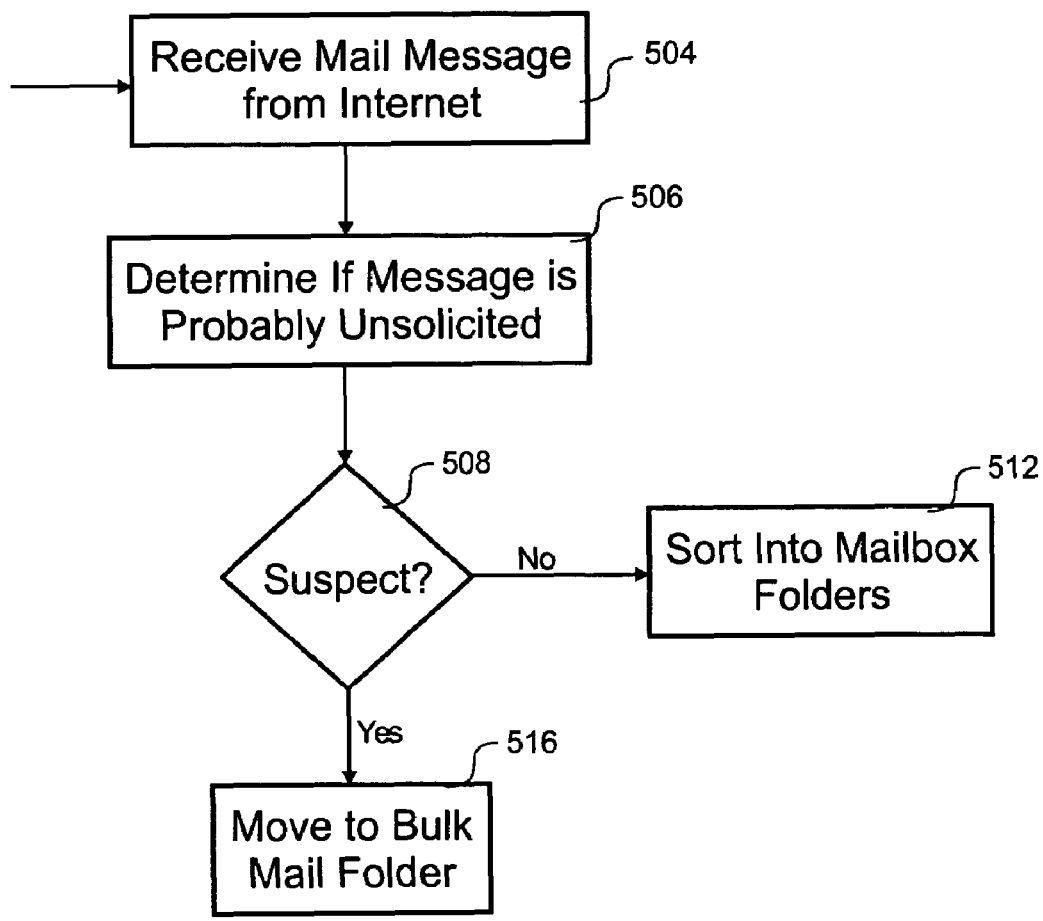
FIG. 5A is a flow diagram of an embodiment of a message processing method.

With reference to FIG. 5A, a flow diagram of an embodiment of a message processing method is shown. This simplified flow diagram processes an incoming message to determine if it is probably unsolicited and sorts the message accordingly. The process begins in step 504 where the mail message is retrieved from the Internet. A determination is made in step 506 if the message is probably unsolicited and suspect. In step 508, suspect messages are sent to a Bulk Mail folder in step 516 and other messages are sorted normally into the user's mailbox in step 512.

Figure 5B:
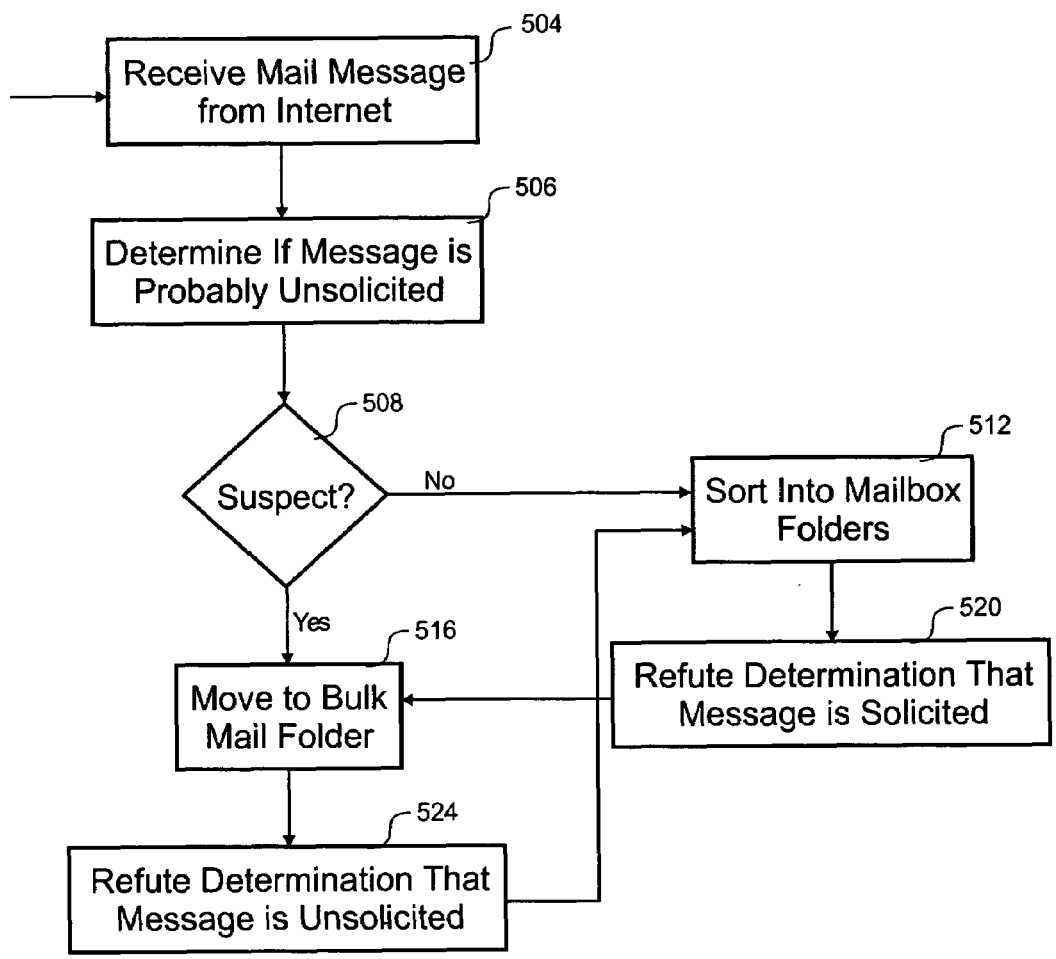
FIG. 5B is a flow diagram of another embodiment of a message processing method.

Referring next to FIG. 5B, a flow diagram of another embodiment of a message processing method is shown. This embodiment adds steps 520 and 524 to the embodiment of FIG. 5A. Picking-up where we left off on FIG. 5A, mail moved to the Bulk Mail folder can be later refuted in step 524 and sorted into the mailbox normally in step 512. Under some circumstances, a bulk mailing will first be presumed unsolicited. If enough users complain that the presumption is incorrect, the mail system 112 will remove the message from the bulk folder for each user. If some unsolicited e-mail is not sorted into the Bulk Mail folder and it is later determined to be unsolicited, the message is resorted into the Bulk Mail folder for all users. If the message has been viewed, the message is not resorted in this embodiment. Some embodiments could flag the message as being miscategorized rather than moving it.

Figure 5C:
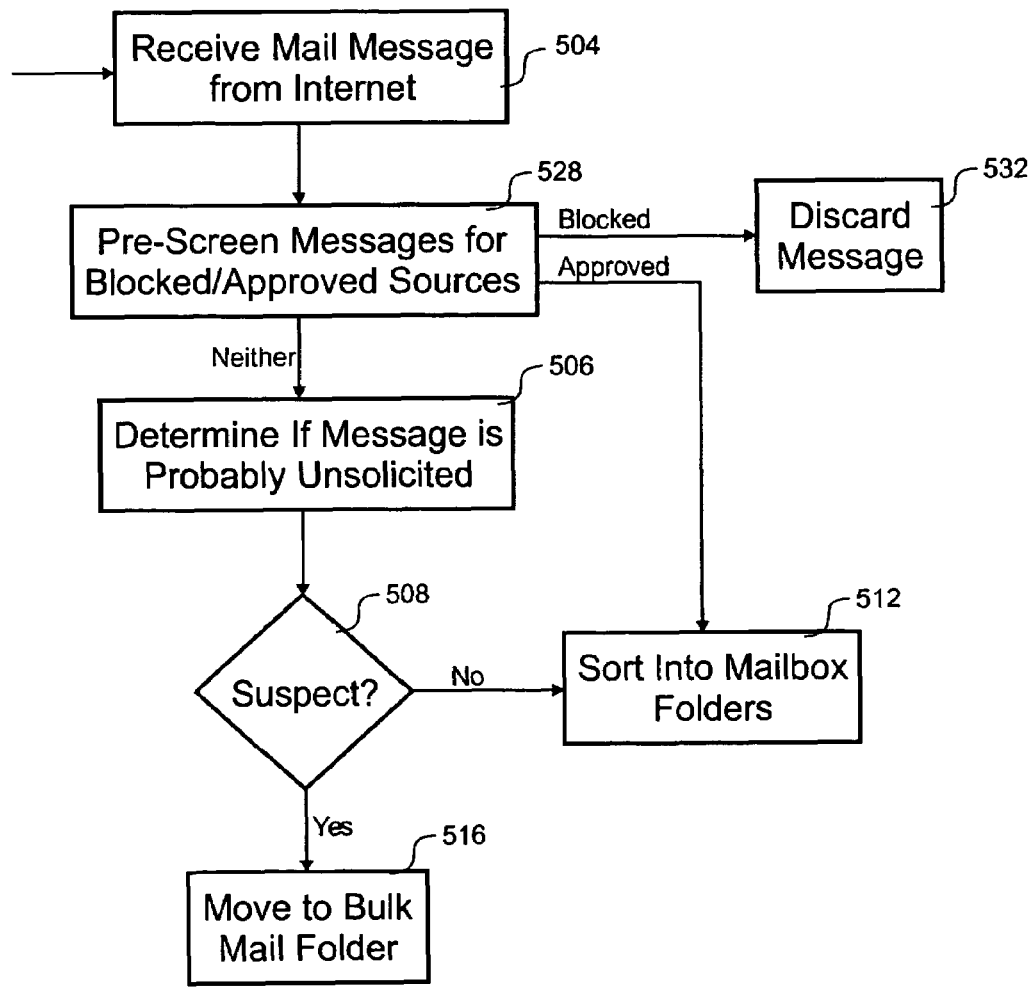
FIG. 5C is a flow diagram of yet another embodiment of a message processing method.

With reference to FIG. 5C, a flow diagram of yet another embodiment of a message processing method is shown. This embodiment differs from the embodiment of FIG. 5A by adding steps 528 and 532. Once a connection is made with the Internet 108 to receive a message 400, a determination is made to see if the message 400 is from a blocked or approved IP address. This determination is made at the protocol-level and does not involve the message header, which may be forged. Blocked and approved addresses are respectively stored in the block list 244 and the approved list 216. Messages from blocked IP addresses are not received by the mail system and messages from approved IP addresses are sorted into the mailbox in step 512 without further scrutiny.

Figure 5D:
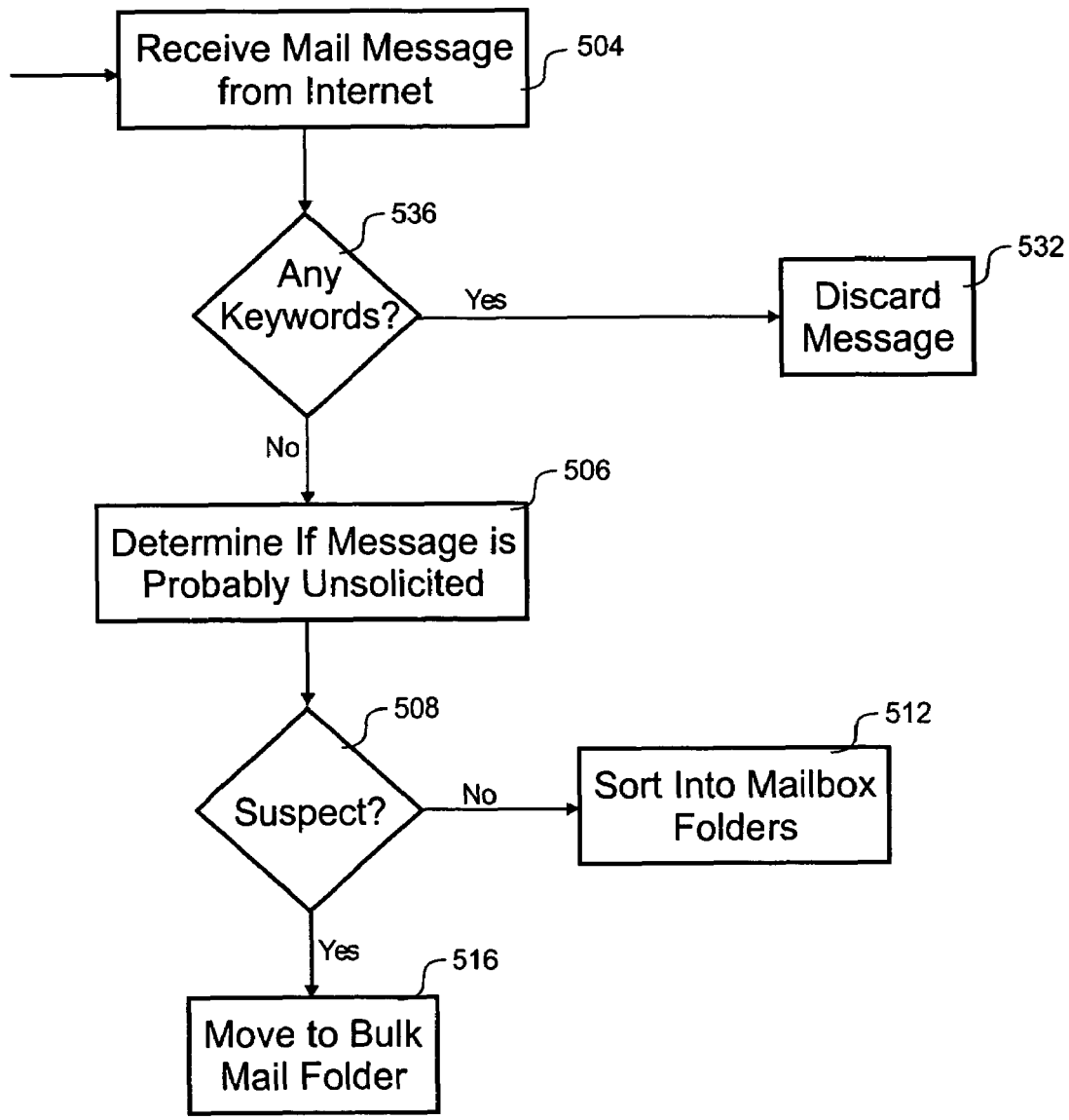
FIG. 5D is a flow diagram of still another embodiment of a message processing method.

Referring next to FIG. 5D, a flow diagram of still another embodiment of a message processing method is shown. This embodiment adds to the embodiment of FIG. 5A the ability to perform keyword checking on incoming messages. Keywords are typically URLs, phone numbers and other words or short phrases that uniquely identify that the message originated from an unsolicited mailer 104. As the mail transfer agent 204 reads each word from the message, any keyword encountered will cause receiving of the message to end such that the message is discarded. Some embodiments could send an error message to the sender.

Figure 5E:
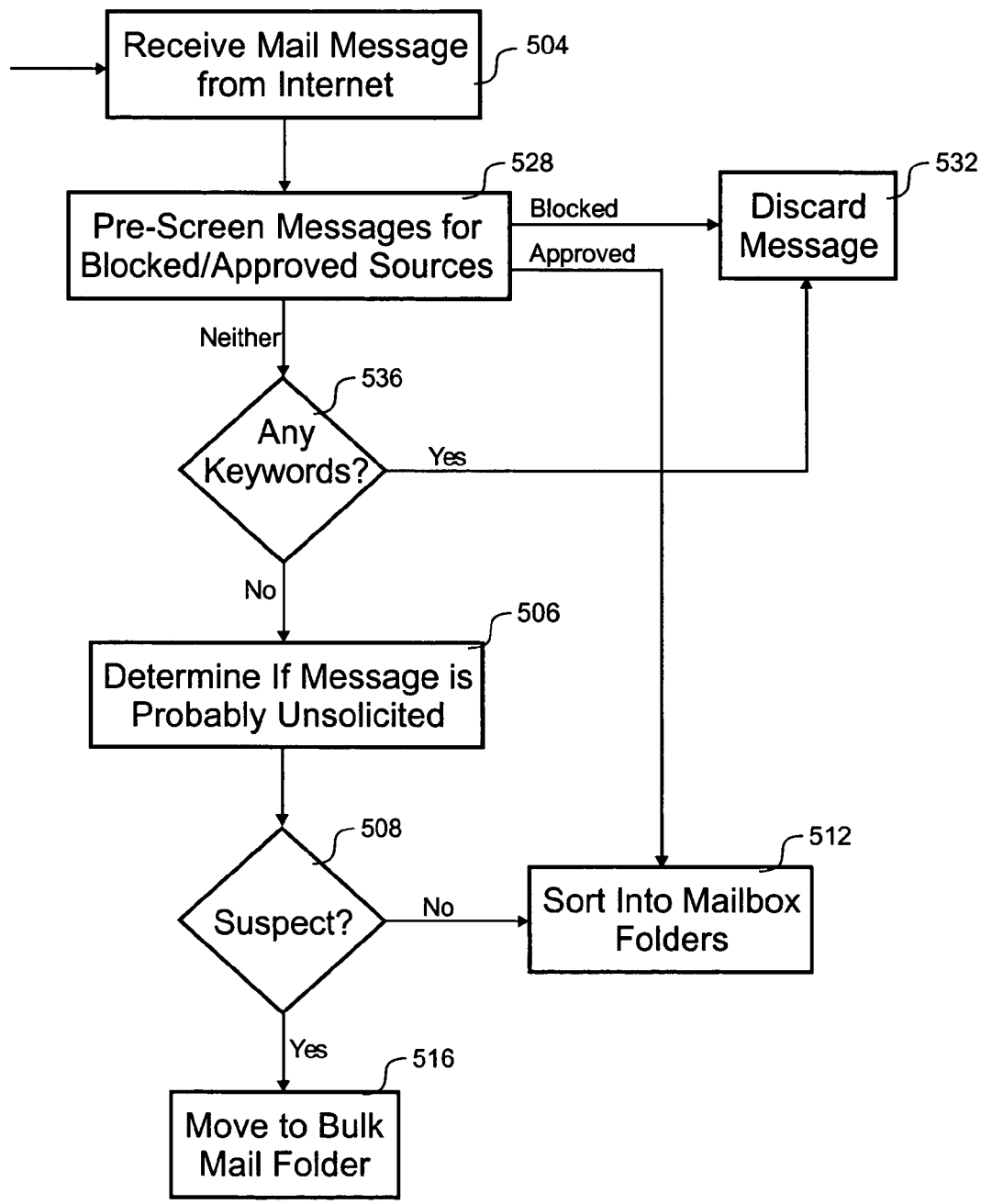
FIG. 5E is a flow diagram of yet another embodiment of a message processing method.

With reference to FIG. 5E, a flow diagram of yet another embodiment of a message processing method is shown. This embodiment uses the prescreening and keyword checking first described in relation to FIGS. 5C and 5D above. Either a blocked e-mail address or a keyword will stop the download of the message from the source in this embodiment, but other embodiments could just store the message in the Bulk Mail folder. Conversely, an approved source IP address will cause the message to be sorted into the mailbox of the user without further scrutiny. Some embodiments could either produce an error message that is sent to the source relay to indicate the message was not received. Alternatively, an error message that implies the e-mail address is no longer valid could be used in an attempt to get the unsolicited mailer or list broker to remove the e-mail address from their distribution list.

Figure 5F:
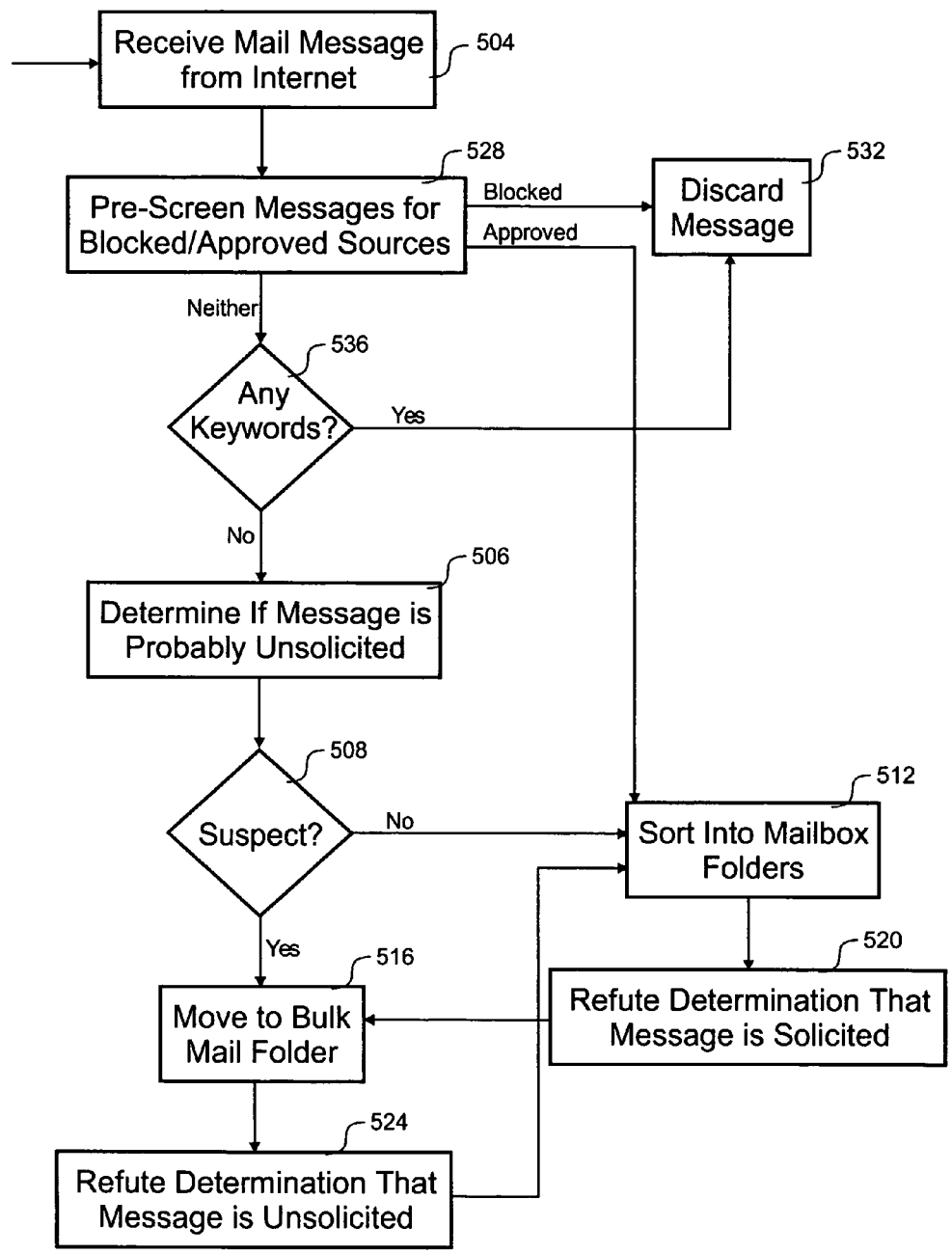
FIG. 5F is a flow diagram of one more embodiment of a message processing method.

Referring next to FIG. 5F, one more embodiment of a message processing method is shown. This embodiment is a hybrid of the methods in FIGS. 5B and 5E where steps 520 and 524 from FIG. 5B are added to FIG. 5E to create FIG. 5F. After step 512 in FIG. 5F, the determination that the message is solicited can be refuted in step 520 before processing proceeds to step 516. After step 516, the determination that the message is unsolicited can be refuted in step 524 before processing continues back to step 512.

Figure 5G:
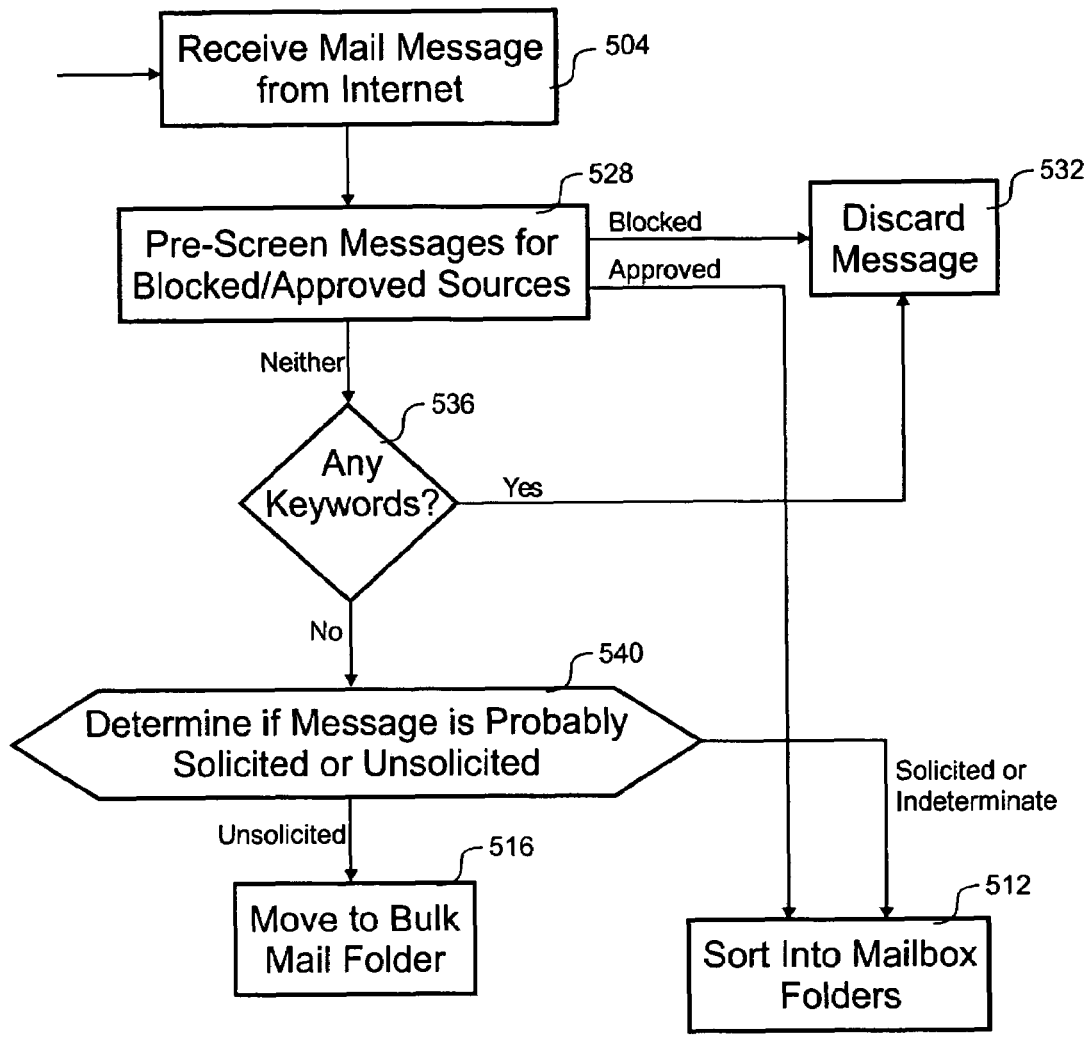
FIG. 5G is a flow diagram of a further embodiment of a message processing method.

Referring next to FIG. 5G, a flow diagram of a further embodiment of a message processing method is shown that performs signature detection on both solicited and unsolicited messages sent in bulk. In this embodiment, steps 504, 528, 532, and 536 are performed as in the embodiment of FIG. 5F. Where there are no keywords recognized in step 536, processing continues to step 540 where the received message is matched to solicited messages and unsolicited messages. Where there is a match to an unsolicited message, the received message is moved to the user's bulk mail folder in step 516. Alternatively, a match to a solicited message would be sorted to the Inbox folder of the user 120 in step 512. Where no match is found, the received message is also sorted to the Inbox folder in step 512.

Figure 6A:
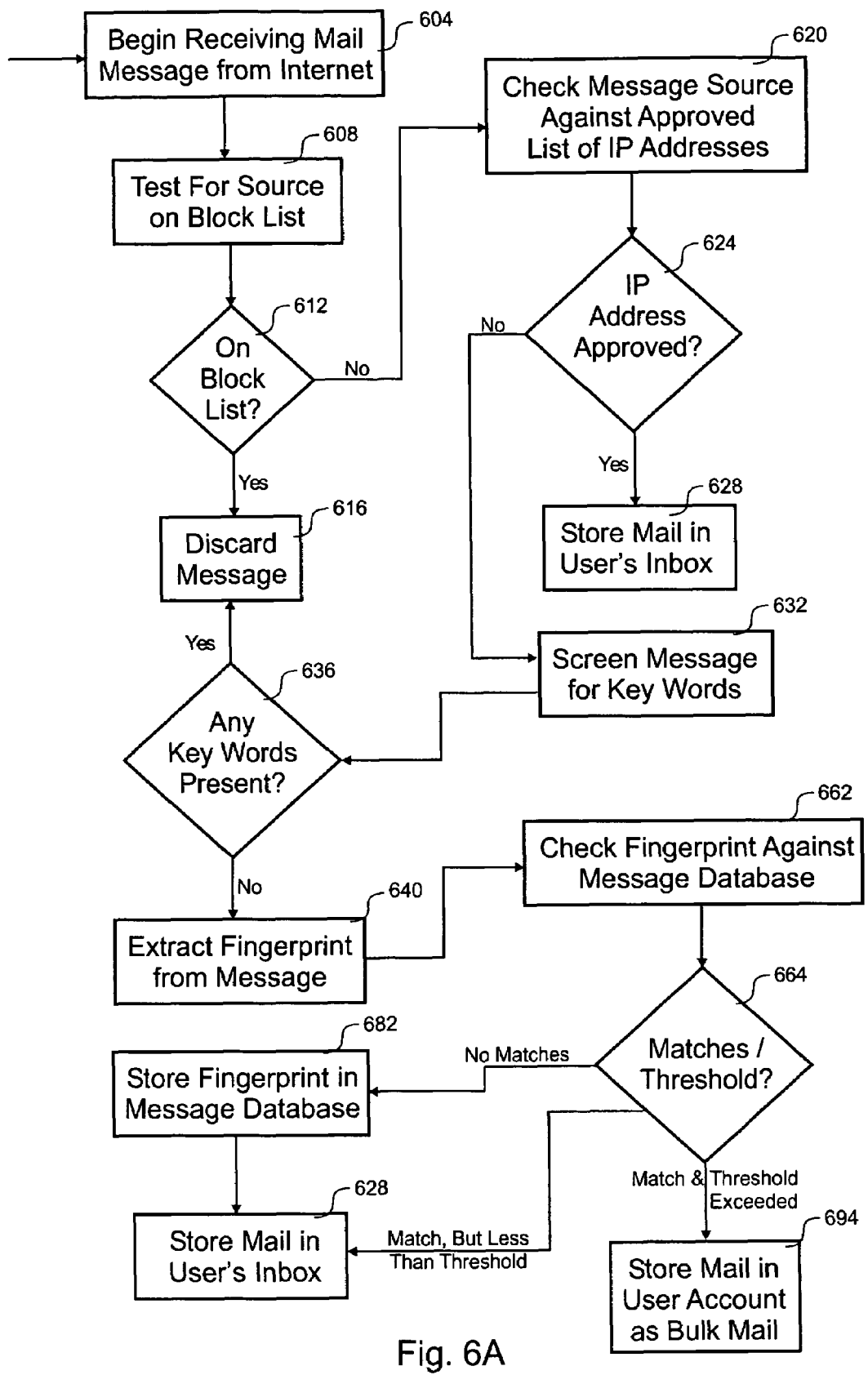
FIG. 6A is a flow diagram of an embodiment of an e-mail processing method.

With reference to FIG. 6A, a flow diagram of an embodiment of an e-mail processing method is depicted. The process starts in step 604 where the mail transfer agent 204 begins to receive the e-mail message 400 from the Internet 108. This begins with a protocol-level handshake where the relay sending the message 400 provides its IP address. In step 608, a test is performed to determine if the source of the e-mail message 400 is on the block list 244. If the source of the message is on the block list 244 as determined in step 612, the communication is dropped in step 616 and the e-mail message 400 is never received. Alternatively, processing continues to step 620 if the message source is not on the block list 244.

E-mail messages 400 from certain "approved" sources are accepted based upon their IP address without further investigation. Each message is checked to determine if it was sent from an IP addresses on the approved list 216 in steps 620 and 624. The IP addresses on the approved list 216 correspond to legitimate senders of e-mail messages in bulk. Legitimate senders of e-mail messages are generally those that have previous relationships with a user 120 who assents to receiving the e-mail broadcast. If the IP address is on the approved list 216, the message is stored in the mail account of the user 120.

If the source of the message 400 is not on the approved list 216, further processing occurs to determine if the message 400 was unsolicited. In step 632, the message body 408 is screened for key words 230 as the message is received. The key words 230 are strings of characters that uniquely identify a message 400 as belonging to an unsolicited mailer 104 and may include a URL 420, a phone number or an e-mail address. If any key words are present in the message body 408, the message 400 is discarded in step 616 without receiving further portions.

To determine if the e-mail message 400 has been sent a number of times over a given time period, an algorithm is used to determine if the e-mail message 400 is similar to others received over some time period in the past. In this embodiment, the algorithm does not require exact matches of the fingerprints. In step 640, a fingerprint is produced from the message body 408. Embodiments that use multiple algorithms on each message generate multiple fingerprints in step 640. The fingerprint is checked against the message database 206 in step 662. As discussed above, multiple algorithms could be used in step 662 to determine if the multiple fingerprints for the message matches any of the stored fingerprints.

If a match is determined in step 664 and a threshold amount of matching messages is received over a given time period, the message is sent to the Bulk Mail folder for the user in step 694. If there is no match, the fingerprint for the message is added to the store(s) in step 682. As a third alternative outcome, the message is stored in the user's mailbox in step 628 without adding a new fingerprint to the database when there is a match, but the threshold is not exceeded. Under these circumstances, a count for the fingerprint is incremented.

Figure 6B:
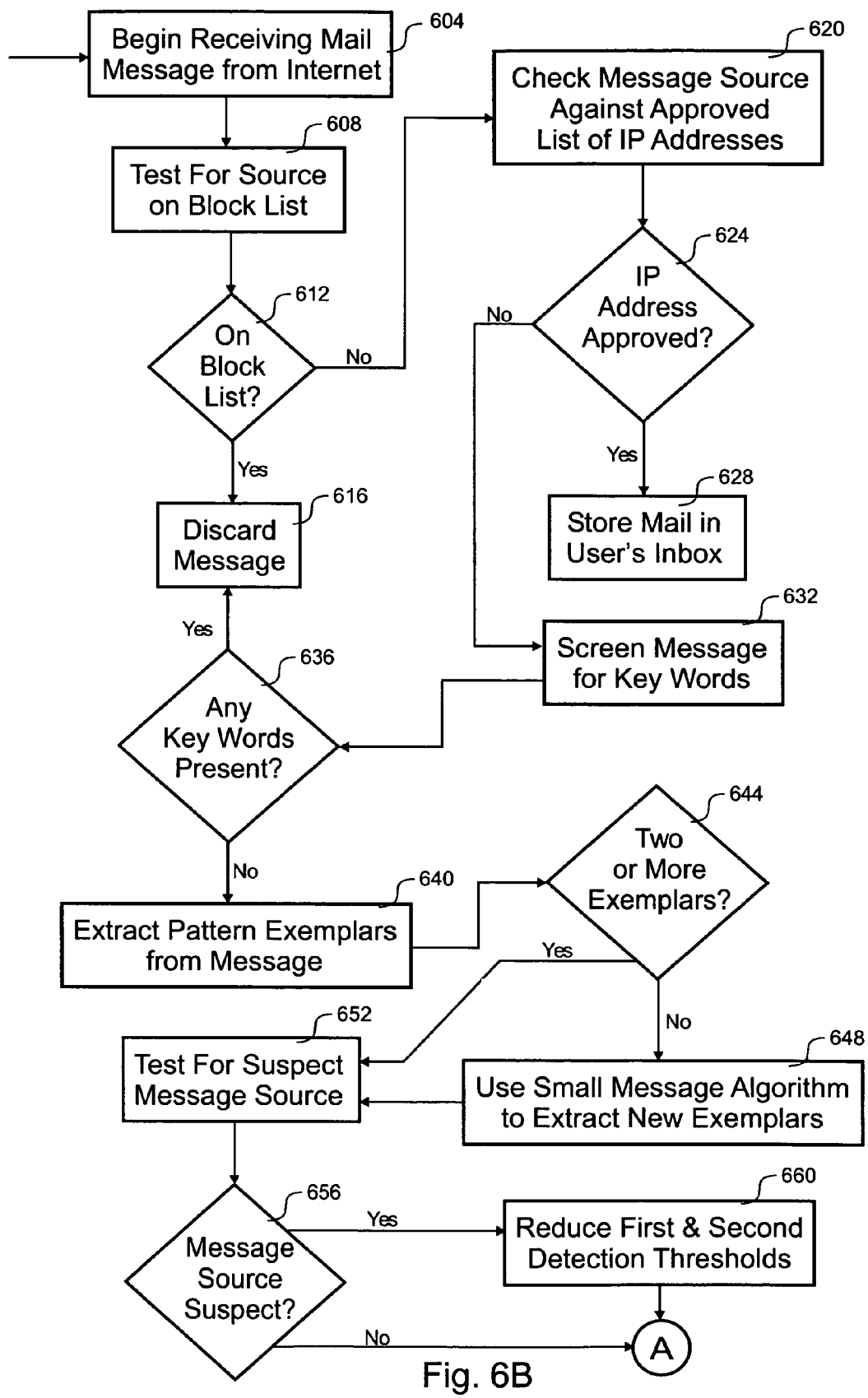
FIG. 6B is an embodiment of a first portion of another embodiment of the e-mail processing method.
Figure 6C:
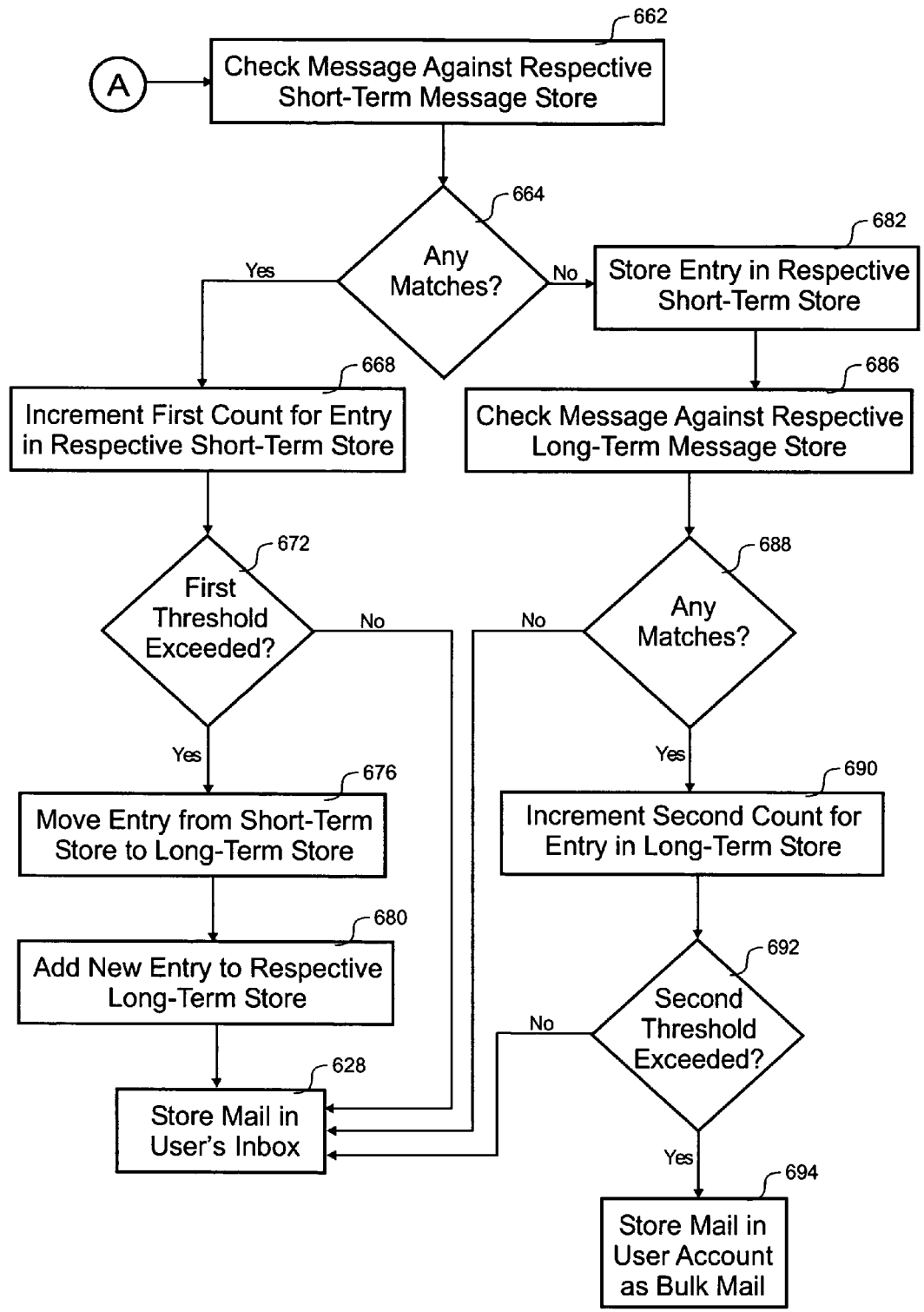
FIG. 6C is an embodiment of a second portion for the embodiment of FIG. 6B.
Figure 6D:
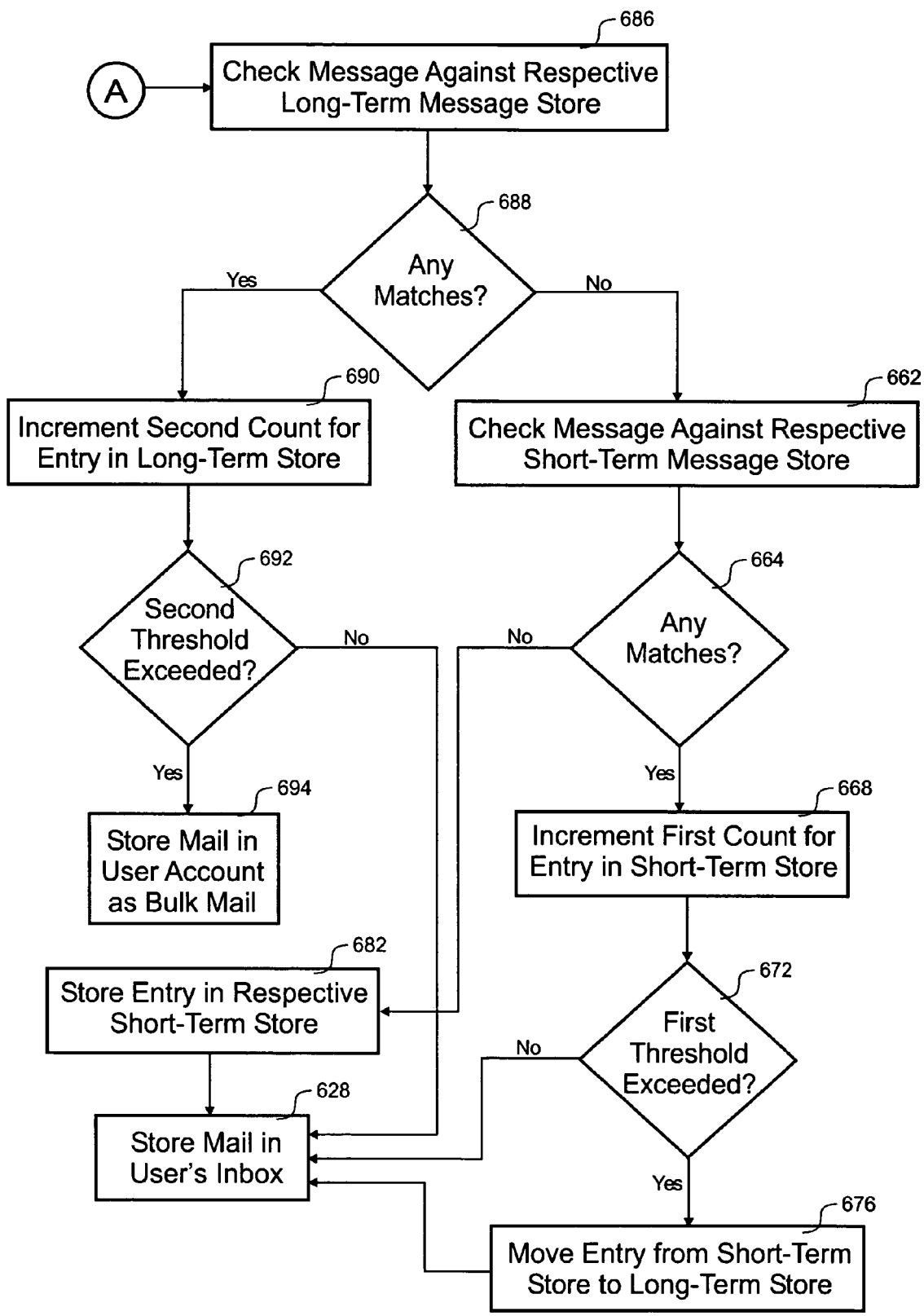
FIG. 6D is another embodiment of the second portion for the embodiment of FIG. 6B.

With reference to FIGS. 6B and 6C, a flow diagram of an embodiment of an e-mail processing method is depicted. FIG. 6D is not part of this embodiment. The process starts in step 604 where the mail transfer agent 204 begins to receive the e-mail message 400 from the Internet 108. This begins with a protocol-level handshake where the relay sending the message 400 provides its IP address. In step 608, a test is performed to determine if the source of the e-mail message 400 is on the block list 244. If the source of the message is on the block list 244 as determined in step 612, the communication is dropped in step 616 and the e-mail message 400 is never received. Alternatively, processing continues to step 620 if the message source is not on the block list 244.

E-mail messages 400 from certain sources are accepted without further investigation. Each message is checked to determine if it was sent from an IP addresses on the approved list 216 in steps 620 and 624. The IP addresses on the approved list 216 correspond to legitimate senders of e-mail messages in bulk. Legitimate senders of e-mail messages are generally those that have previous relationships with a user 120 where the user assents to receiving the e-mail broadcast. If the IP address is on the approved list 216, the message is stored in the mail account of the user 120 in step 628.

Further processing occurs to determine if the message 400 was unsolicited if the source of the message 400 is not on the approved list 216. In step 632, the message body 408 is screened for key words 230. The key words 230 are strings of characters that uniquely identify a message 400 as belonging to an unsolicited mailer 104 and may include a URL 420, a phone number or an e-mail address. If any key words are present in the message body 408, the message 400 is discarded in step 616 without further processing.

To determine if the e-mail message 400 has been sent a number of times, an algorithm is used to determine if the e-mail message 400 is similar to others received in the past. The algorithm does not require exact matches and only requires some of the exemplars that form a fingerprint to match. In step 640, exemplars are extracted from the message body 408 to form a fingerprint for the message 408. A determination is made in step 644 as to whether there are two or more exemplars harvested from the message body 408.

In this embodiment, more than two exemplars are considered sufficient to allow matching, but two or less is considered insufficient. When more exemplars are needed, a small message algorithm is used to extract a new set of exemplars to form the fingerprint in step 648. The small message algorithm increases the chances of accepting a string of characters for generating an exemplar upon. Future matching operations depend upon whether the exemplars were extracted using the small message or large message algorithm to generate those exemplars. The small message stores 368, 372 are used with the small message algorithm, and the large message stores 360, 364 are used with the large message algorithm.

The thresholds for detection of unsolicited e-mail are reduced when the message is received by the mail system 112 from an open relay. Open relays are often used by unsolicited mailers 104 to mask the IP address of the true origin of the e-mail message 400, among other reasons. By masking the true origin, the true origin that could identify the unsolicited mailer 104 is not readily ascertainable. However, the IP address of the relay that last sent the message to the mail system 112 can be accurately determined. The actual IP address of the last relay before the message 400 reaches the mail system 112 is known from the protocol-level handshake with that relay. The actual IP address is first checked against the local open relay list 220 for a match. If there is no match, the actual IP address is next checked against the remote open relay list 240 across the Internet 108. If either the local or remote open relay lists 220, 240 include the actual IP address, first and second detection threshold are reduced in step 660 as described further below. Table I shows four embodiments of how the first and second detection thresholds might be reduced. Other embodiments could use either the local or remote open relay list 220, 240.

TABLE I

| First Detection Threshold | | Second Detection Threshold | |
|---|---|---|---|
| Without | With Match | Without | With Match |
| 10 | 5 | 25 | 12 |
| 50 | 25 | 100 | 50 |
| 100 | 50 | 500 | 250 |
| 500 | 300 | 1000 | 600 |

Depending on whether the e-mail message 400 is a short or long message as determined in step 644, either the STSME store 368 or STLME store 372 is checked for a matching entry. The STSME and STLME stores 368, 372 hold the last two hours of message fingerprints, in this embodiment, along with a first count for each. The first count corresponds to the total number of times the mail transfer agents 204 have seen a similar message within a two hour period so long as the count does not exceed the first threshold.

A test for matches is performed in step 664. A match only requires a percentage of the exemplars in the fingerprint to match (e.g., 50%, 80%, 90%, or 100%). In this embodiment, a match is found when all of the exemplars of a fingerprint stored in the respective STSME or STLME store 368, 372 are found in the exemplars of the message currently being processed. Other embodiments could only require less than all of the exemplars in the respective STSME or STLME store 368, 372 are found in the message being processed. For example the other embodiment could require half of the exemplars to match.

If a match is determined in step 664 between the current e-mail message 400 and the respective STSME or STLME store 368, 372, processing continues to step 668 where a first count is incremented. The first count is compared to the first threshold in step 672. Depending on the determination in step 656, the first threshold may or may not be reduced. If the first threshold is not exceeded, processing continues to step 628 where the e-mail message 400 is stored in the user's Inbox folder.

Alternatively, processing continues to step 676 if the first threshold is exceeded by the first count. The fingerprint of exemplars for the e-mail message 400 is moved from the short-term store 368, 372 to the respective long-term store 360, 364 in step 676. In step 680, the new fingerprint will replace the oldest fingerprint in the long-term store 360, 364 that has not been incremented in the last thirty-six hours. A fingerprint becomes stale after thirty-six hours without any change in count, in this embodiment. If there is no stale entry, the new fingerprint is added to the store 360, 364 and an index that points to the fingerprint is added to the beginning of a list of indexes such that the freshest or least stale fingerprint indexes are at the beginning of the index list of the long-term store 360, 364. Once the fingerprint is added to appropriate the long-term store 360, 364, the e-mail message 400 is stored in the account of the user in step 628.

Returning back to step 664, processing continues to step 686 if there is not a match to the appropriate short-term message database 368, 372. In step 686, the message fingerprint is checked against the appropriate long-term message store 360, 364. Only a percentage (e.g., 50%, 80%, 90%, or 100%) of the exemplars need to exactly match an entry in the appropriate long-term message store 360, 364 to conclude that a match exists. The long-term message store 360, 364 used for this check is dictated by whether the long or short message algorithm is chosen back in step 644. If there is not a match determined in step 688, the e-mail message 400 is stored in the mailbox of the user in step 628. Otherwise, processing continues to step 690 where the second count for the fingerprint entry is incremented in the long-term store 360, 364. When the second count is incremented, the fingerprint entry is moved to the beginning of the long-term store 360, 364 such that the least stale entry is at the beginning of the store 360, 364.

In step 692, a determination is made to see if the e-mail message 400 is unsolicited. If the second threshold is exceeded, the e-mail message is deemed unsolicited. Depending on determination made in step 656 above, the second threshold is defined according to the embodiments of Table I. If the second threshold is exceeded, the e-mail message 400 is stored in the Bulk Mail folder of the user's account in step 694. Otherwise, the e-mail message 400 is stored in the Inbox folder. In this way, the efforts of unsolicited mailers 104 are thwarted in a robust manner because similar messages are correlated to each other without requiring exact matches. The first and second thresholds along with the times used to hold fingerprints in the exemplar database 208 could be optimized in other embodiments.

With reference to FIGS. 6B and 6D, a flow diagram of another embodiment of an e-mail processing method is depicted. FIG. 6C is not a part of this embodiment. This embodiment checks long-term message exemplars store 360, 364 before short-term message exemplars store 368, 372.

Figure 6E:
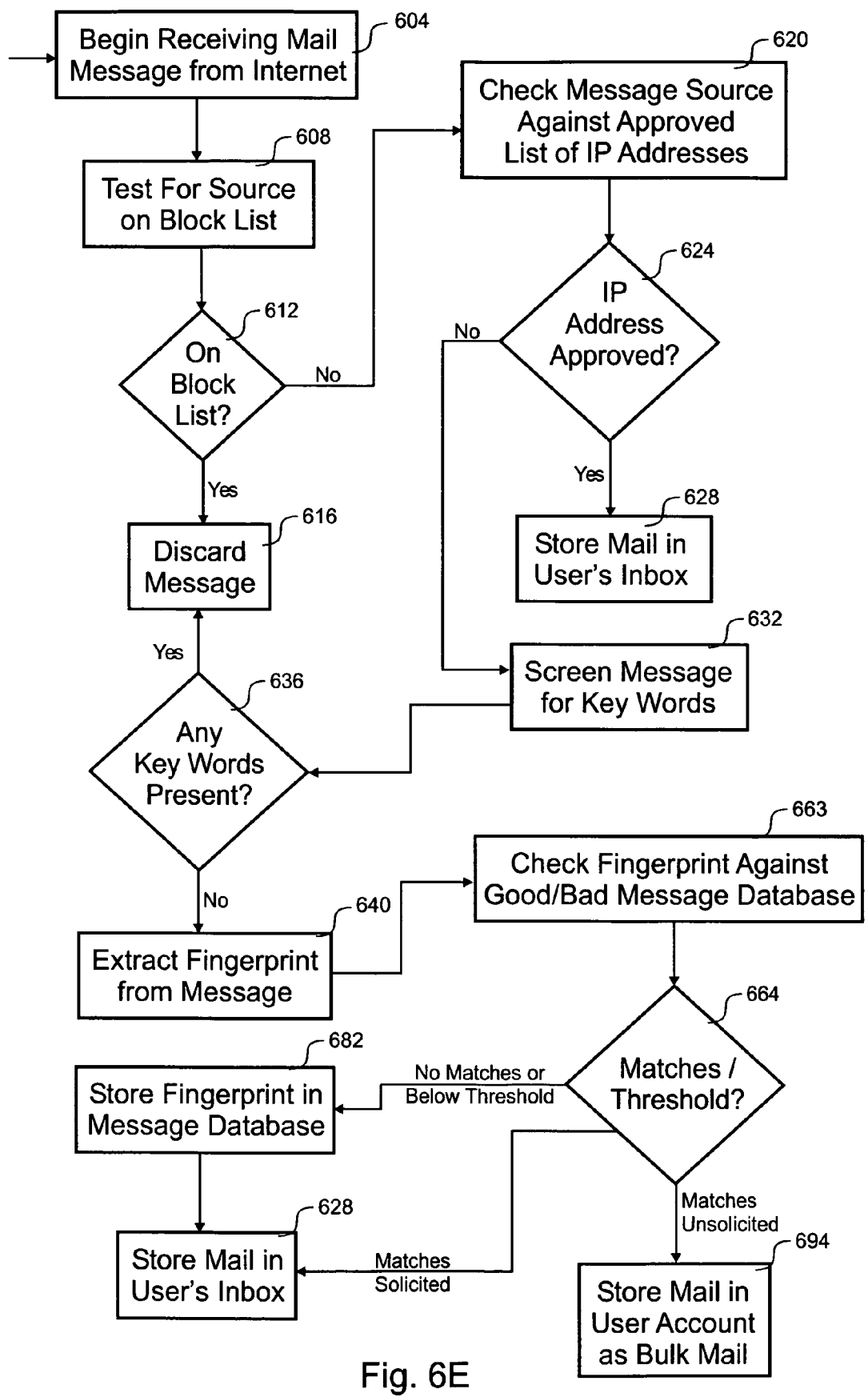
FIG. 6E is a flow diagram of another embodiment of the e-mail processing method.

With reference to FIG. 6E, a flow diagram of another embodiment of the e-mail processing method is shown. This embodiment checks message fingerprints against databases for both solicited and unsolicited messages. Received messages that match a known solicited message are stored to the user's Inbox in the normal manner. For example, invoices sent from a shopping site would all appear similar enough to have similar fingerprints. Subsequent messages that match those from the shopping site would be whitelisted as a solicited message. The steps in this embodiment are the same as FIG. 6A until step 664.

After the extracted fingerprint is matched to existing fingerprints in step 663, any matches are determined in step 664. Where there is a match beyond a threshold, the message is sorted to the user's Inbox in step 628 if it matches a solicited message and sorted to the Bulk Mail folder in step 694 where it matches an unsolicited message. The threshold could be a number of the exemplars. Where there are multiple algorithms, a match could be formulated by using those algorithms.

In step 664, where there is no match to a known solicited message or a known unsolicited message, a fingerprint is stored in the message database 206 in step 682. Some exemplars could match, but the match might be below a threshold such that any match could not be confirmed. Where the threshold is not satisfied, the fingerprint is stored in step 682.

Figure 7A:
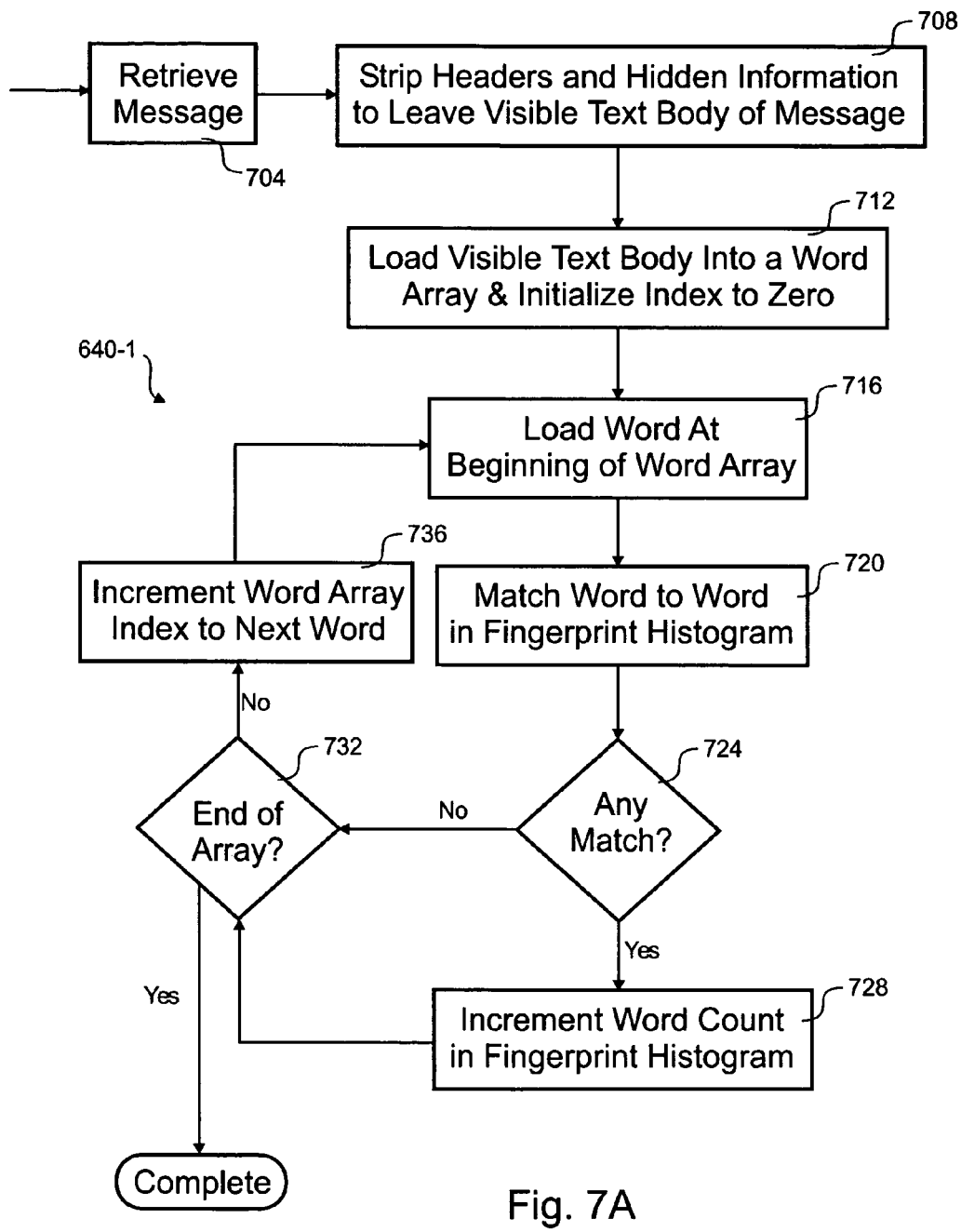
FIG. 7A is a flow diagram of an embodiment for producing a fingerprint for an e-mail message.

Referring next to FIG. 7A, a flow diagram 640-1 of another embodiment for producing a fingerprint for an e-mail message is shown. The process begins in step 704 where an e-mail message 400 is retrieved. Information such as headers or hidden information in the body 408 of the message 400 is removed to leave behind the visible body 408 of the message 400 in step 708. Hidden information is anything that is not visible to the user when reading the message such as white text on a white background or other HTML information. Such hidden information could potentially confuse processing of the message 400.

To facilitate processing, the visible text body is loaded into a word array in step 712. Each element in the word array has a word from the message body 408. The index of the word array is initialized to zero or the first word of the array. In step 716, the word located at the index is loaded. That word is matched against the possible words in a fingerprint histogram. The fingerprint histogram includes five hundred of the most common words used in unsolicited e-mail messages.

If a match is made to a word in the fingerprint histogram, the count for that word is incremented in step 728. Processing continues to step 732 after the increment. Returning to step 724 once again. If there is no match to the words in the histogram, processing also continues to step 732.

A determination is made in step 732 of whether the end of the word array has been reached. If the word array has been completely processed the fingerprint histogram is complete. Alternatively, processing continues to step 736 when there are more words in the array. In step 736, the word array index is incremented to the next element. Processing continues to step 716 where the word is loaded and checked in a loop until all words are processed.

In this way, a fingerprint histogram is produced that is indicative of the message. Matching of the fingerprint histograms could allow slight variance for some words so as to not require exactly matching messages.

Figure 7B:
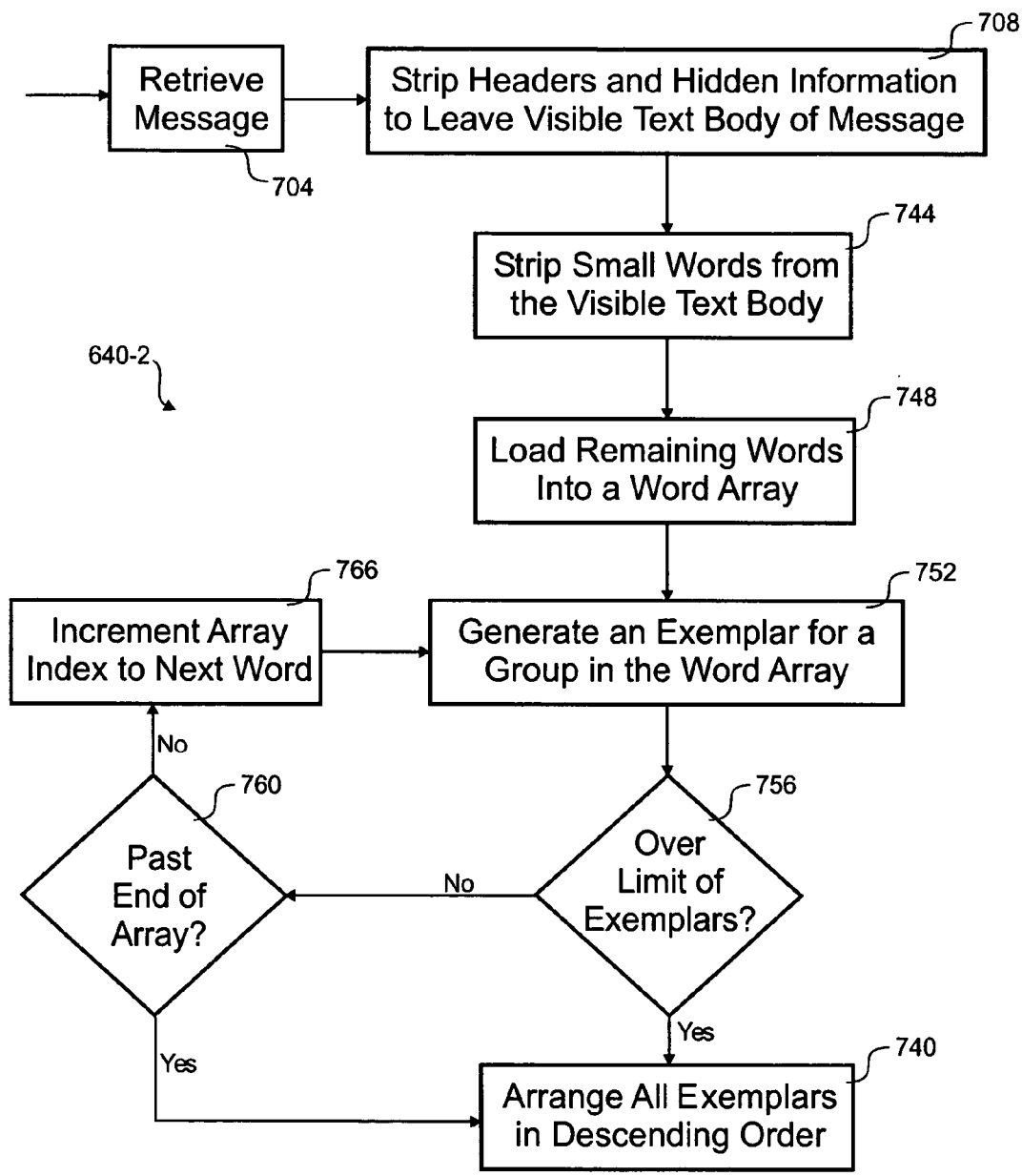
FIG. 7B is a flow diagram of another embodiment for producing a fingerprint for an e-mail message.

With reference to FIG. 7B, a flow diagram 640-2 of another embodiment for producing a fingerprint for an e-mail message is shown. The process begins in step 704 where an e-mail message 400 is retrieved. Information such as headers or hidden information in the body 408 of the message 400 is removed to leave behind the visible body 408 of the message 400 in step 708. In step 744, the small words are stripped from the visible text body such that only large words remain. The definition of what constitutes a small word can be between four and seven characters. In this embodiment, a word of five characters or less is a small word.

In step 748, the remaining words left after removal of the small words are loaded into a word array. Each element of the word array contains a word from the message and is addressed by an index.

Groups of words from the word array are used to generate a code or exemplar in step 752. The exemplar is one of a hash function, a checksum or a cyclic redundancy check of the ASCII characters that comprise the group of words. The group of words could include from three to ten words. This embodiment uses five words at a time. Only a limited amount of exemplars are gathered from messages. If the maximum number of exemplars have been gathered, they are sorted into descending order as the fingerprint in step 740.

Presuming all the exemplars have not been gathered, processing continues to step 760 where it is determined if all the word groups have been processed. If processing is complete, the exemplars are sorted in descending order as the fingerprint in step 740. Otherwise, processing continues to step 766 where the array index is incremented to the next word. The next word is processed by looping back to step 752. This looping continues until either all word groups are processed or the maximum amount of exemplars is gathered.

Some embodiments could load the words into a character array and analyze a group of characters at a time. For example, a group of twenty characters at one time could be used to generate an exemplar before incrementing one character in the array. In other embodiments, exemplars for the whole message could be gathered. These exemplars would be reduced according to some masking algorithm until a limited number remained. This would avoid gathering the exemplars from only the beginning of a large message.

Figure 7C:
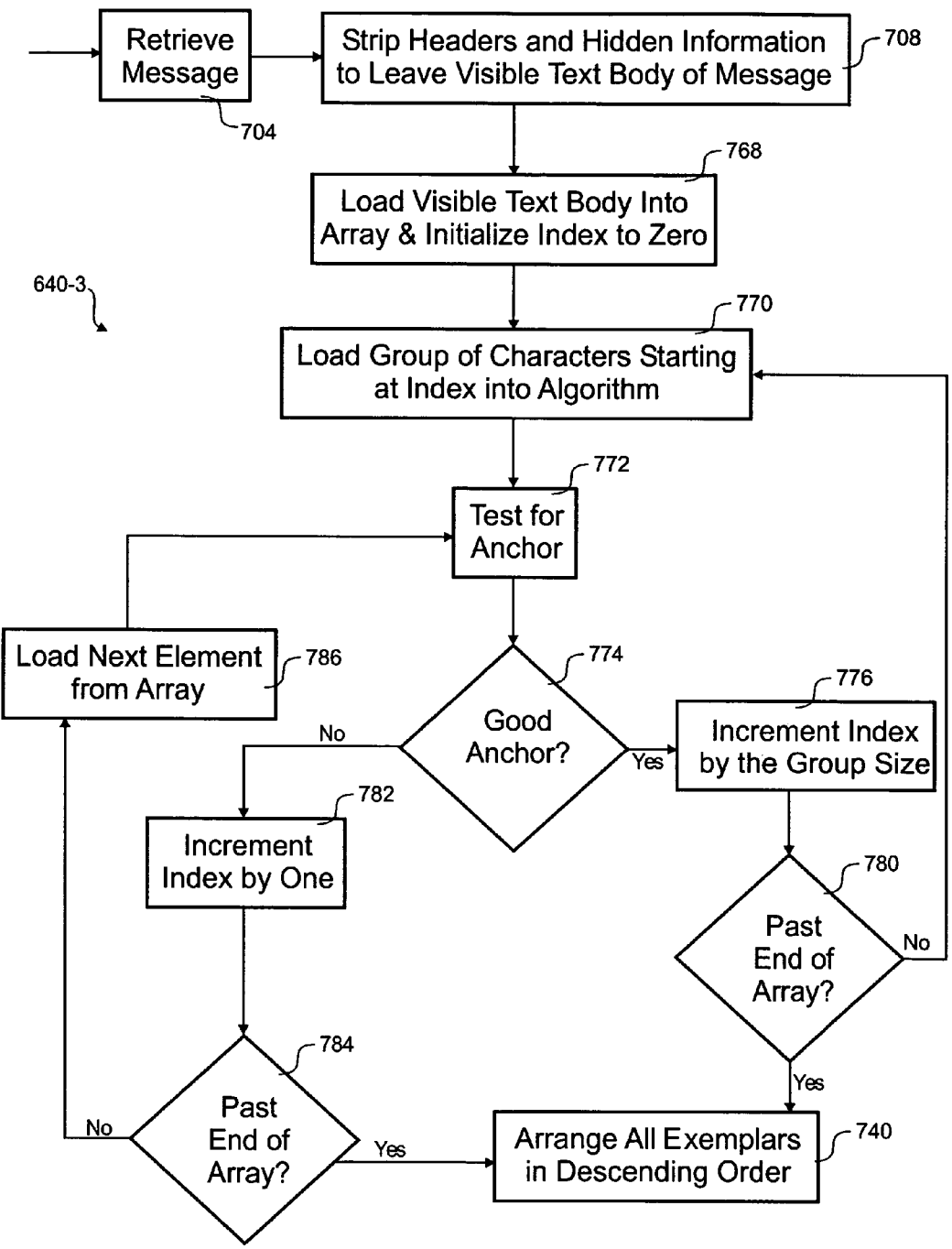
FIG. 7C is a flow diagram of yet another embodiment for producing a fingerprint for an e-mail message.

Referring next to FIG. 7C, a flow diagram 640-3 of yet another embodiment for producing a fingerprint for an e-mail message is shown. The process begins in step 704 where an e-mail message 400 is retrieved. Information such as headers or hidden information in the body 408 of the message 400 is removed to leave behind the visible body 408 of the message 400 in step 708. Hidden information is anything that is not visible the user when reading the message such as white text on a white background or other HTML information. Such hidden information could potentially confuse processing of the message 400.

To facilitate processing, the visible text body is loaded into a string or an array in step 768. The index of the array is initialized to zero or the first element of the array. In step 770, the first group of characters in the array are loaded into an exemplar algorithm. Although any algorithm that produces a compact representation of the group of characters could be used, the following equation is used in step 772:

$$E_n = \left(\sum_{i=1}^{i=20} t_i p^{20-i}\right) \bmod M \quad (1)$$

In Equation 1 above, the potential exemplar, E, starting at array index, n, is calculated for each of the group of characters, $t_i$, where p is a prime number and M is a constant. Four embodiments of values used for the $t_i$, M, and p constants are shown in Table II below.

TABLE II

| $t_i$ | M | p | X | Y |
|---|---|---|---|---|
| 20 | $2^{32}$ | 567,319 | $157_8$ | $55_8$ |
| 25 | $2^{32}$ | 722,311 | $147_8$ | $54_8$ |
| 30 | $2^{32}$ | 826,997 | $143_8$ | $50_8$ |
| 40 | $2^{32}$ | 914,293 | $61_8$ | $40_8$ |

Only some of the potential exemplars E resulting from Equation 1 are chosen as good anchors such that the potential exemplar E is stored in the fingerprint. Further to step 772, the potential exemplar E is converted to a binary value and masked by an octal value that is also converted to binary. If the result from the masking step includes any bits equal to one, the potential exemplar E is used in the fingerprint for the message 400. The large message algorithm uses a first octal value, X, converted into a binary mask and the small message algorithm uses a second octal value, Y, converted into a binary mask such that the small message algorithm is more likely to accept any potential exemplar E. See Table II for different embodiments of the first and second octal values X, Y.

If the potential exemplar E is chosen as an anchor in step 774, it is added to the fingerprint and the array index is incremented by the size of the group of characters, $t_i$, in step 776. The index is incremented to get a fresh set of characters to test for an anchor. If it is determined the whole array has been processed in step 780, the exemplars are arranged in descending order to allow searching more efficiently through the fingerprint during the matching process. Presuming the array is not completely analyzed, processing loops back to step 770 where a new group of characters are loaded and analyzed.

Alternatively, the index is only incremented by one in step 782 if the anchor is not chosen in step 774. Only a single new character is needed to calculate the next potential exemplar since the other nineteen characters are the same. The exit condition of passing the end of the array is checked in step 784. If the exit condition is satisfied, the next element from the array is loaded in step 786. A simplified Equation 2 may be used to determine the next potential exemplar, $E_{n+1}$, by adding the last coefficient and removing the first one:

$$E_{n+1} = (pE_n + t_{21} - t_1 p^{19}) \bmod M \quad (2)$$

In this way, the exemplars that form the fingerprint for the message body are calculated.

Figure 7D:
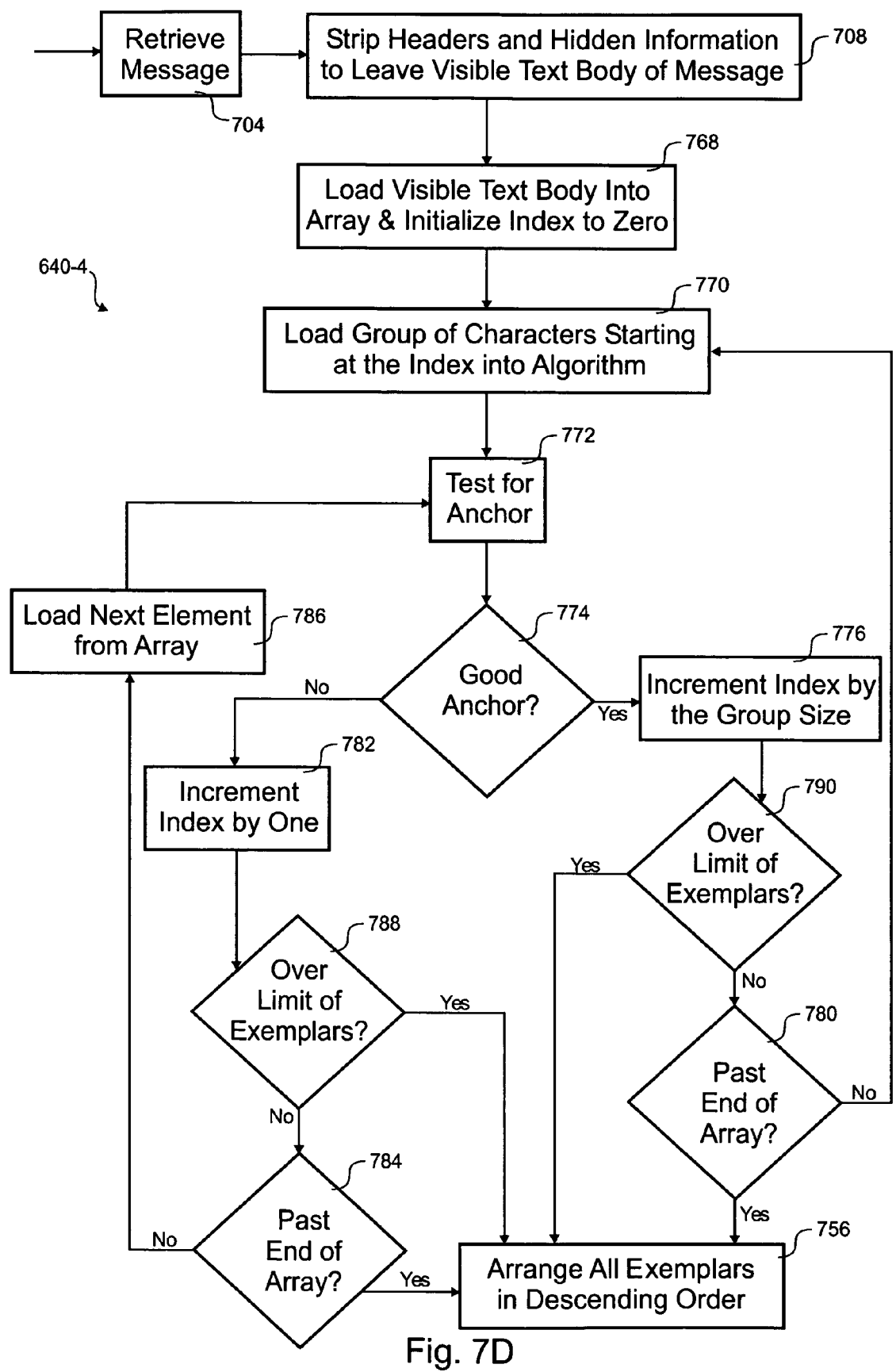
FIG. 7D is a flow diagram of still another embodiment for producing a fingerprint for an e-mail message.

Referring next to FIG. 7D, a flow diagram 640-4 of still another embodiment for producing a fingerprint for an e-mail message is shown. This embodiment differs from the embodiment of FIG. 7C in that it adds another exit condition to each loop in steps 788 and 790. Once a maximum number of exemplars is gathered as determined in either step 788 or 790, the loop exits to step 756 where the exemplars are sorted in descending order to form the fingerprint. Various embodiments could use, for example, five, fifteen, twenty, thirty, forty, or fifty exemplars as a limit before ending the fingerprinting process.

Figure 7E:
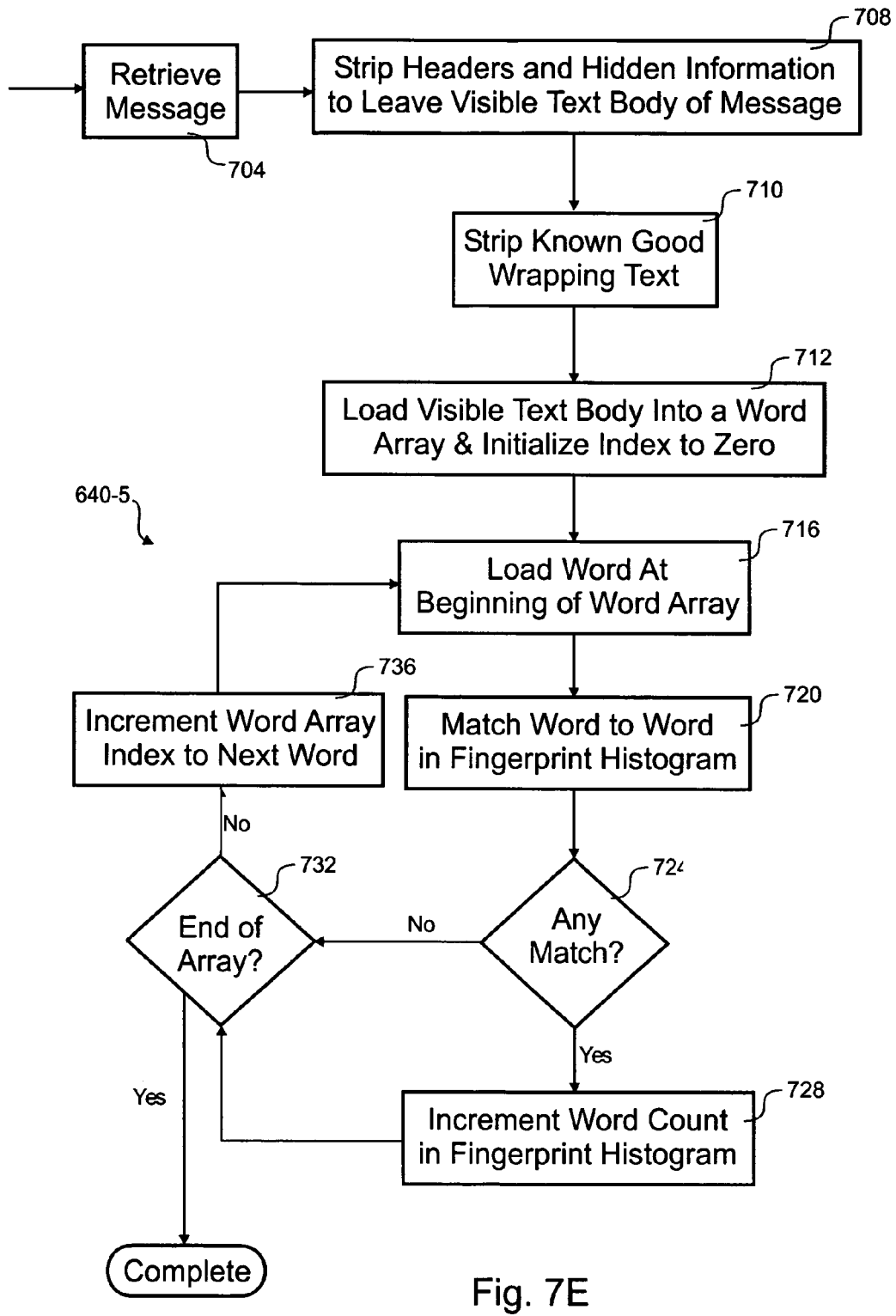
FIG. 7E is a flow diagram of yet one more embodiment for producing a fingerprint for an e-mail message.

With reference to FIG. 7E, a flow diagram 640-5 of yet one more embodiment for producing a fingerprint for an e-mail message is shown that filters out common extraneous information. This embodiment is similar to the embodiment of FIG. 7A except that a new step 710 is inserted between steps 708 and 712. In step 710, commonly occurring pictures, links and text that is not helpful in determining solicited and unsolicited messages is removed. For example, e-mail messages from Yahoo™ put a footer on outgoing messages such that all messages from that source appear partially similar. Using that footer in formulating a fingerprint might cause interpreting the message as solicited when that might not be the case. That information commonly added to messages is removed in step 710 before proceeding with the remaining steps of the embodiment of FIG. 7A.

Figure 7F:
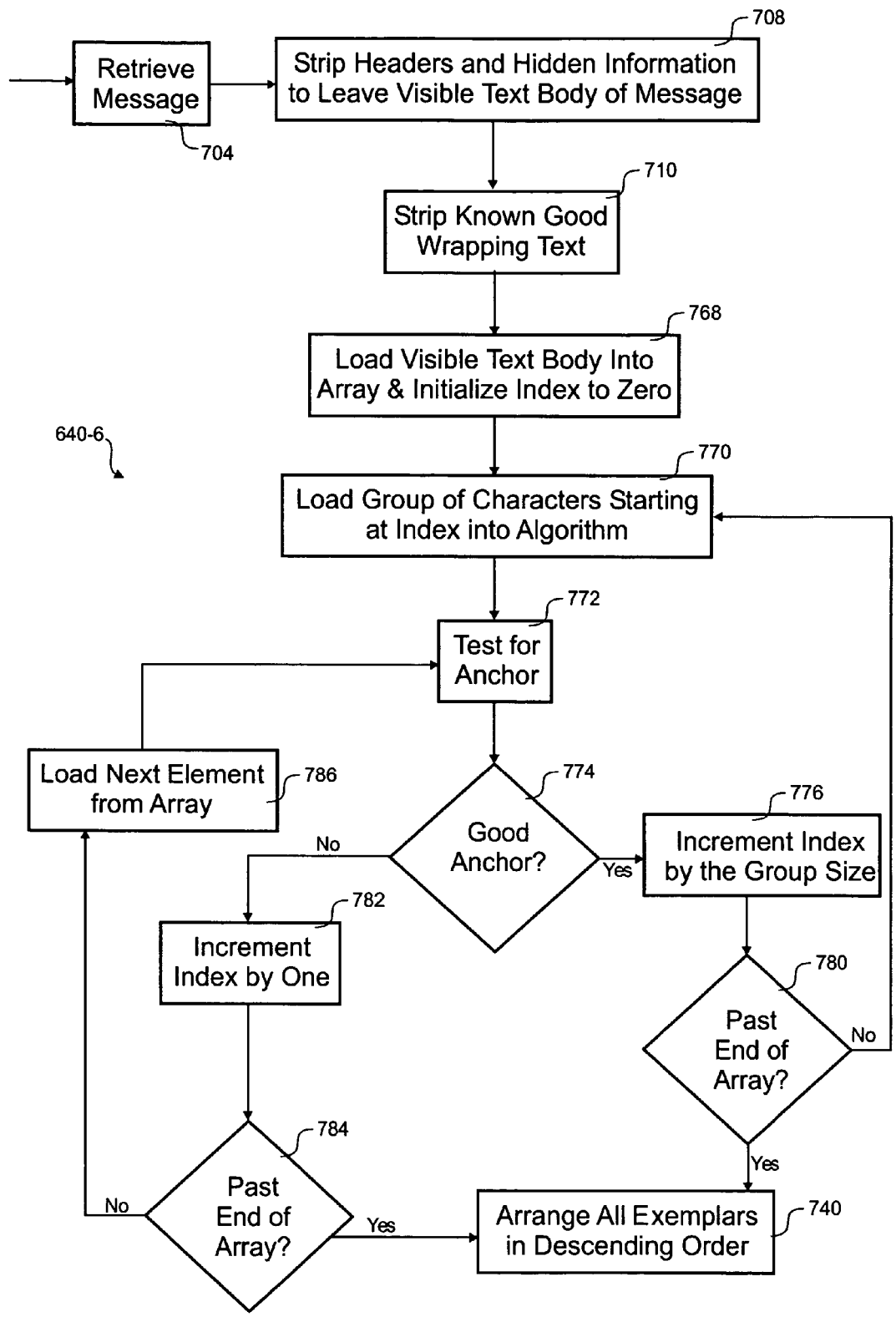
FIG. 7F is a flow diagram of still one more embodiment for producing a fingerprint for an e-mail message.

Referring next to FIG. 7F, a flow diagram 640-6 of still one more embodiment for producing a fingerprint for an e-mail message is shown that also filters out common extraneous information. This embodiment is similar to the embodiment of FIG. 7C, except step 710 is inserted between steps 708 and 768. Superfluous information that is commonly added to messages is removed in step 710. Exemplars generated from the removed information could make a message appear solicited when it is not.

A number of variations and modifications of the invention can also be used. For example, the invention could be used by ISPs on the server-side or users on the client-side. Also, the algorithm could be used for any task requiring matching of messages to avoid reaction to repeated messages. For example, political campaigns or tech support personnel could use the above invention to detect multiple e-mails on the same subject.

In one embodiment, all the various techniques to detect unsolicited e-mail could be flipped around to detect solicited messages. Those techniques could cause the message to be sorted as solicited without further testing to determine if the message is unsolicited.

In another embodiment, the message header is tested to determine if an IP address is on the approved list. Where that is the case, testing could be performed to determine if it is solicited. Otherwise, the tests to see if the message is solicited could be avoided and only test for the message being unsolicited.

In another embodiment, the present invention can be used to find similarities in chat room comments, instant messages, newsgroup postings, electronic forum postings, message board postings, and classified advertisement. Once a number of similar electronic text communications are found, subsequent electronic text can be automatedly processed. Processing may include filtering if this bulk advertisement is unwanted, or could include automated responses. Advertisement is published in bulk to e-mail accounts, chat rooms, newsgroups, forums, message boards, and classifieds. If this bulk advertisement is unwanted, the invention can recognize it and filter it accordingly.

In some embodiments, the invention could be used for any task requiring matching of electronic textual information to avoid reaction to repeated messages. For example, political campaigns or tech support personnel could use the above invention to detect multiple e-mails on the same subject. Specifically, when the e-mail account holders complain to customer service that an e-mail is mistakenly being sorted into the Bulk Mail folder, customer service does not need multiple requests for moving the sender to the approved list. The invention can recognize similar requests and only present one to customer service.

While the principles of the disclosure have been described above in connection with specific apparatuses and methods, it is to be clearly understood that this description is made only by way of example and not as limitation on the scope of the invention.

What is claimed is:

1. A method for determining electronic text communication distributed in bulk is likely solicited, the method comprising:

receiving a first electronic and a second electronic submission;

determining that the first electronic submission is likely solicited;

extracting a first portion from the first electronic submission using a first extraction algorithm and extracting a second portion from the second electronic submission using a second extraction algorithm, wherein content of the first electronic submission influences the first extraction algorithm and content of the second electronic submission influences the second extraction algorithm;

determining a first code for the first portion and a second code for the second portion, wherein the first code is indicative of the first portion and the second code is indicative of the second portion;

comparing the first code to the second code; and determining that the second electronic submission is likely solicited, at least in part, in response to comparing the first code to the second code.

2. The method for determining electronic text communication distributed in bulk is likely solicited as recited in claim 1, further comprising a step of removing a known good clipping of text from the second electronic submission before the step of extracting a second portion.

3. The method for determining electronic text communication distributed in bulk is likely solicited as recited in claim 1, wherein the first portion is extracted from visible text in the first electronic submission.

4. The method for determining electronic text communication distributed in bulk is likely solicited as recited in claim 1, wherein the first portion is related to the first code by one of a hash function, a checksum or a cyclic redundancy check (CRC).

5. The method for blocking electronic text communication distributed in bulk recited in claim 1, wherein each of the first and second codes is represented in less bits than a corresponding portion.

6. The method for determining electronic text communication distributed in bulk is likely solicited as recited in claim 1, wherein at least one of the first or second electronic submission is chosen from the group consisting of an electronic mail message, a chat room comment, an instant message, a pager message, a mobile phone message, a newsgroup posting, an electronic forum posting, a message board posting, or a classified advertisement.

7. A method for determining electronic text communication distributed in bulk is likely solicited, the method comprising:
  receiving a first electronic and a second electronic submission;
  determining that the first electronic submission is likely solicited;
  extracting a first portion from the first electronic submission and a second portion from the second electronic submission, wherein content of the first electronic submission influences extraction of the first portion and content of the second electronic submission influences extraction of the second portion;
  determining a first code for the first portion and a second code for the second portion, wherein the first code is indicative of the first portion and the second code is indicative of the second portion;
  comparing the first code to the second code;
  determining that the second electronic submission is likely solicited, at least in part, in response to comparing the first code to the second code;
  modifying a count in response to the comparing of the first code with the second code;
  determining if the count reaches a threshold;
  comparing a third code associated with a third electronic submission; and
  automatically determining the third electronic submission is likely solicited if the third code matches the second code.

8. A computer-readable storage medium having computer-program instructions for determining electronic text communication distributed in bulk is likely solicited, the computer-program instruction for performing a process comprising:
  receiving a first electronic and a second electronic submission;
  determining that the first electronic submission is likely solicited;
  extracting a first portion from the first electronic submission using a first extraction algorithm and extracting a second portion from the second electronic submission using a second extraction algorithm, wherein content of the first electronic submission influences the first extraction algorithm and content of the second electronic submission influences the second extraction algorithm;
  determining a first code for the first portion and a second code for the second portion, wherein the first code is indicative of the first portion and the second code is indicative of the second portion;
  comparing the first code to the second code; and
  determining that the second electronic submission is likely solicited, at least in part, in response to comparing the first code to the second code.

9. A computer system adapted to perform the computer-implementable method for determining electronic text communication distributed in bulk is likely solicited of claim 1.

10. A method for determining electronic text communication distributed in bulk is likely solicited, the method comprising:
  receiving a first electronic submission;
  determining that the first electronic submission is likely solicited by a receiver of the first electronic submission;
  extracting a first portion from the first electronic submission, wherein content of the first electronic submission influences extraction of the first portion;
  determining at least a first code for the first portion, wherein the first code is indicative of the first portion;
  receiving a second electronic submission;
  extracting a second portion from the second electronic submission, wherein content of the second electronic submission influences extraction of the second portion;
  determining at least a second code for the second portion, wherein the second code is indicative of the second portion;
  comparing the first code with the second code;
  modifying a count in response to the comparing of the first code with the second code;
  determining if the count reaches a threshold; and
  automatically determining that the second electronic submission is likely solicited based, at least in part, upon the determining if the count reaches the threshold.

11. The method for determining electronic text communication distributed in bulk is likely solicited as recited in claim 10, wherein the first electronic submission is addressed to the recipient, but the second electronic submission is not.

12. The method for determining electronic text communication distributed in bulk is likely solicited as recited in claim 10, wherein the first and second codes are each a number represented in a same number of bits.

13. The method for determining electronic text communication distributed in bulk is likely solicited as recited in claim 10, wherein at least one of the first or second electronic submission is chosen from the group consisting of an electronic mail message, a chat room comment, an instant message, a pager message, a mobile phone message, a newsgroup posting, an electronic forum posting, a message board posting, or a classified advertisement.

14. A computer-readable storage medium having computer-program instructions for determining electronic text communication distributed in bulk is likely solicited, the computer-program instruction for performing a process comprising:
  receiving a first electronic submission;
  determining that the first electronic submission is likely solicited by a receiver of the first electronic submission;
  extracting a first portion from the first electronic submission using a first extraction algorithm, wherein content of the first electronic submission influences the first extraction algorithm;
  determining at least a first code for the first portion, wherein the first code is indicative of the first portion;
  receiving a second electronic submission;
  extracting a second portion from the second electronic submission using a second extraction algorithm, wherein content of the second electronic submission influences the second extraction algorithm;
  determining at least a second code for the second portion, wherein the second code is indicative of the second portion;
  comparing the first code with the second code;
  modifying a count in response to the comparing of the first code with the second code;
  determining if the count reaches a threshold; and
  automatically determining that the second electronic submission is likely solicited based, at least in part, upon the determining if the count reaches the threshold.

15. A computer system adapted to perform the computer-implementable method for determining electronic text communication distributed in bulk is likely solicited of claim 10.

16. A method for determining electronic text communication distributed in bulk is likely solicited, the method comprising:
- receiving a first electronic submission addressed to a recipient, wherein the first electronic submission is likely solicited by the recipient;
- extracting a first plurality of portions from the first electronic submission, wherein content of the first electronic submission influences extraction of the first plurality of portions;
- determining a first plurality of codes for the first plurality of portions, wherein each of the first plurality of codes is indicative of its respective portion;
- receiving a second electronic submission;
- extracting a second plurality of portions from the second electronic submission, wherein content of the second electronic submission influences extraction of the second plurality of portions;
- determining a second plurality of codes for the second plurality of portions, wherein each of the second plurality of codes is indicative of its respective portion;
- comparing the first plurality of codes with the second plurality of codes;
- modifying a count in response to the comparing of the first plurality of codes with the second plurality of codes;
- determining if the count reaches a threshold; and
- automatically determining that the second electronic submission is likely solicited in response, at least in part, to determining if the count reaches the threshold.

17. The method for determining electronic text communication distributed in bulk is likely solicited as recited in claim 16, wherein a solicited electronic message is one that does not violate any statute related to bulk mail distribution.

18. The method for determining electronic text communication distributed in bulk is likely solicited as recited in claim 16, wherein the comparing the first plurality of codes with a second plurality of codes comprises determining if a percentage of the first plurality of codes exactly matches one of the second plurality of codes.

19. The method for determining electronic text communication distributed in bulk is likely solicited as recited in claim 16, wherein interrupting the first-listed extracting step when the first plurality of portions reaches a predetermined count.

20. A computer-readable storage medium having computer-program instructions for determining electronic text communication distributed in bulk is likely solicited, the computer-program instruction for performing a process comprising:
- receiving a first electronic submission addressed to a recipient, wherein the first electronic submission is likely solicited by the recipient;
- extracting a first plurality of portions from the first electronic submission using a first extraction algorithm, wherein content of the first electronic submission influences the first extraction algorithm;
- determining a first plurality of codes for the first plurality of portions, wherein each of the first plurality of codes is indicative of its respective portion;
- receiving a second electronic submission;
- extracting a second plurality of portions from the second electronic submission using a second extraction algorithm, wherein content of the second electronic submission influences the second extraction algorithm;
- determining a second plurality of codes for the second plurality of portions, wherein each of the second plurality of codes is indicative of its respective portion;
- comparing the first plurality of codes with the second plurality of codes;
- modifying a count in response to the comparing of the first plurality of codes with the second plurality of codes;
- determining if the count reaches a threshold; and
- automatically determining that the second electronic submission is likely solicited in response, at least in part, to determining if the count reaches the threshold.

21. A computer system adapted to perform the computer-implementable method for determining electronic text communication distributed in bulk is likely solicited of claim 16.

* * * * *